(12) United States Patent  (10) Patent No.: US 8,095,493 B2
Di Profio  (45) Date of Patent: Jan. 10, 2012

(54) INFORMATION PROCESSING APPARATUS, INFORMATION PROCESSING METHOD AND COMPUTER PROGRAM

(75) Inventor: Ugo Di Profio, Kanagawa (JP)

(73) Assignee: Sony Corporation, Tokyo (JP)

( * ) Notice: Subject to any disclaimer, the term of this patent is extended or adjusted under 35 U.S.C. 154(b) by 1017 days.

(21) Appl. No.: 12/011,754

(22) Filed: Jan. 29, 2008

(65) Prior Publication Data

US 2008/0183652 A1 Jul. 31, 2008

(30) Foreign Application Priority Data

Jan. 31, 2007 (JP) ................................ P2007-020470

(51) Int. Cl.
*G06N 5/00* (2006.01)
(52) U.S. Cl. .......................................... 706/47; 706/45
(58) Field of Classification Search .................... 706/47, 706/45
See application file for complete search history.

(56) References Cited

U.S. PATENT DOCUMENTS

| | | |
|---|---|---|
| 2002/0103793 A1 | 8/2002 | Koller et al. |
| 2004/0220892 A1 | 11/2004 | Cohen et al. |

FOREIGN PATENT DOCUMENTS

| | | |
|---|---|---|
| JP | 2003 271168 | 9/2003 |
| JP | 2006 238409 | 9/2006 |

OTHER PUBLICATIONS

Littman, Algorithms for Sequential Decision Making, Thesis, Brown University, Department of Computer Science, Mar. 1996, pp. 1-283.*

* cited by examiner

*Primary Examiner* — Wilbert L Starks
(74) *Attorney, Agent, or Firm* — Frommer Lawrence & Haug LLP; William S. Frommer

(57) ABSTRACT

An information processing apparatus that constructs an information analysis processing configuration to be applied to information analysis processing in a target area including uncertainty is disclosed. The apparatus includes a data processing section that performs processing of automatically creating a Partially Observable Markov Decision Process (POMDP) model from the input of attribute data including attribute information and an attribute value, and a rule storage section storing a rule to be applied to processing of creating a Partially Observable Markov Decision Process (POMDP) in the data processing section, wherein the data processing section is configured to create a Partially Observable Markov Decision Process (POMDP) model by performing, as an action, processing of creating and outputting a question based on the attribute data, obtaining the answer to the question as observation information, and performing processing of creating probability distribution information corresponding to an object based on the obtained observation information.

8 Claims, 20 Drawing Sheets

FIG. 2

| Attribute: Velue |
|---|
| station: TELEVISION ABC |
| year: 2006 |
| month: 05 |
| date: 11 |
| start: 13:30 |
| end: 15:30 |
| program-title: MOVIE "PRETTY LEAGUE" |
| program-subtitle: |
| genre: 80 |
| subgenre: 144 |
| : : |

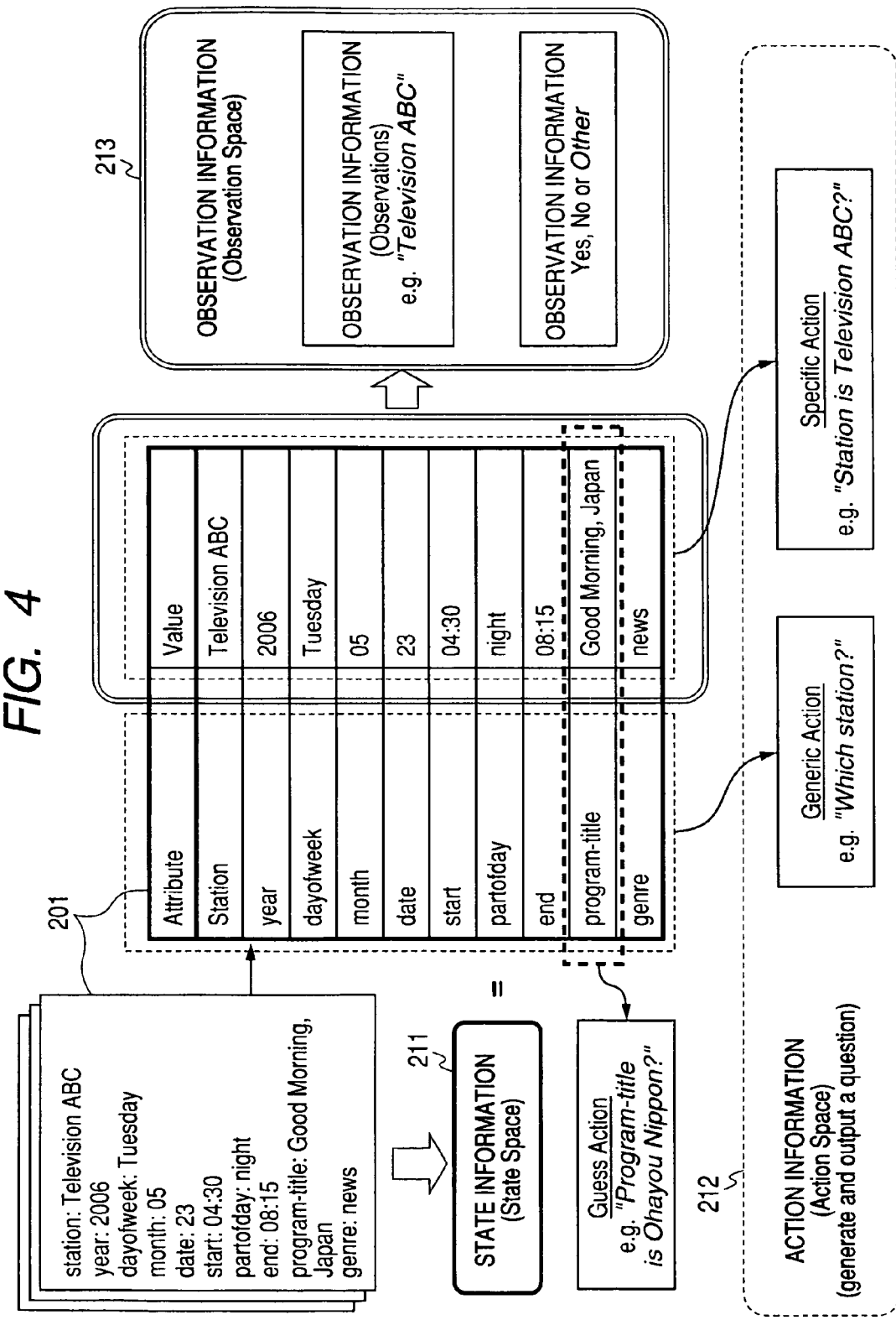

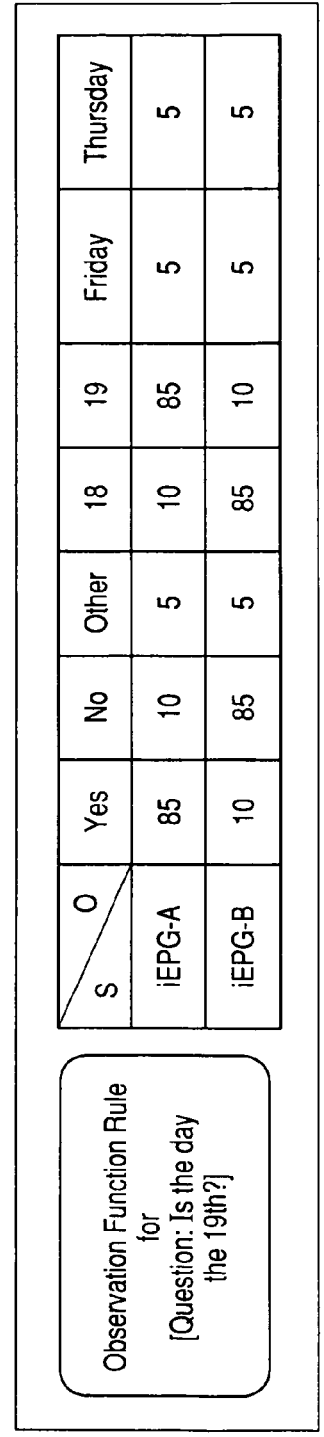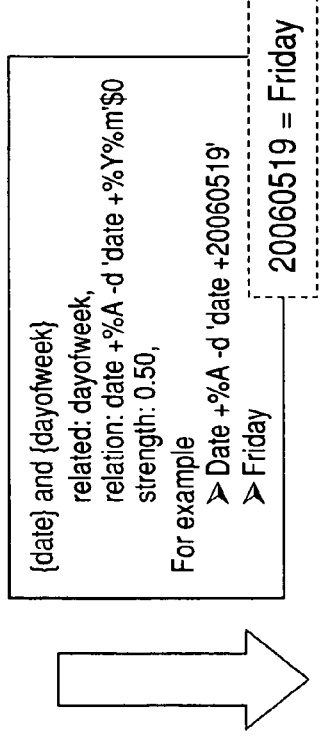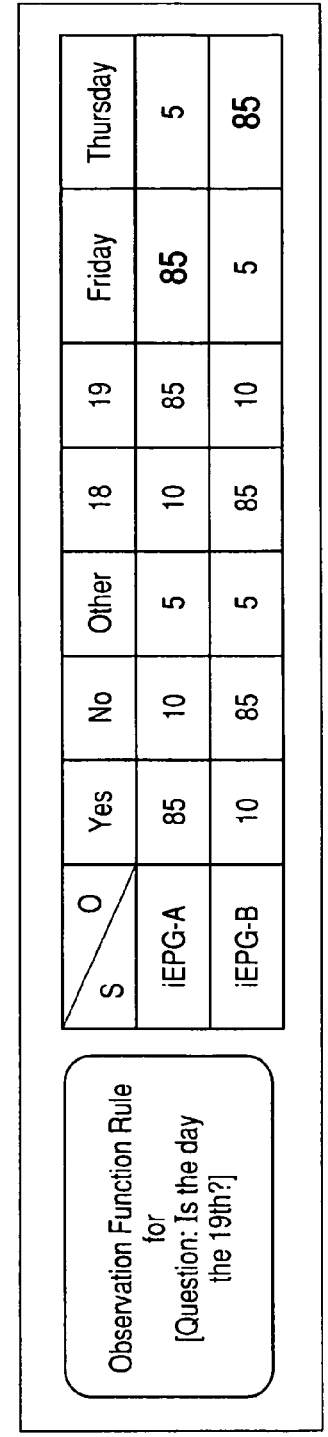
FIG. 7A
FIG. 7B

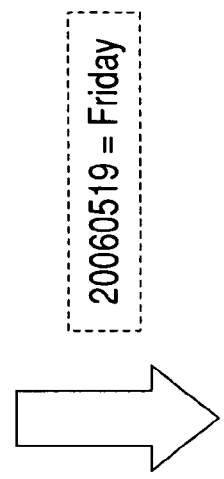

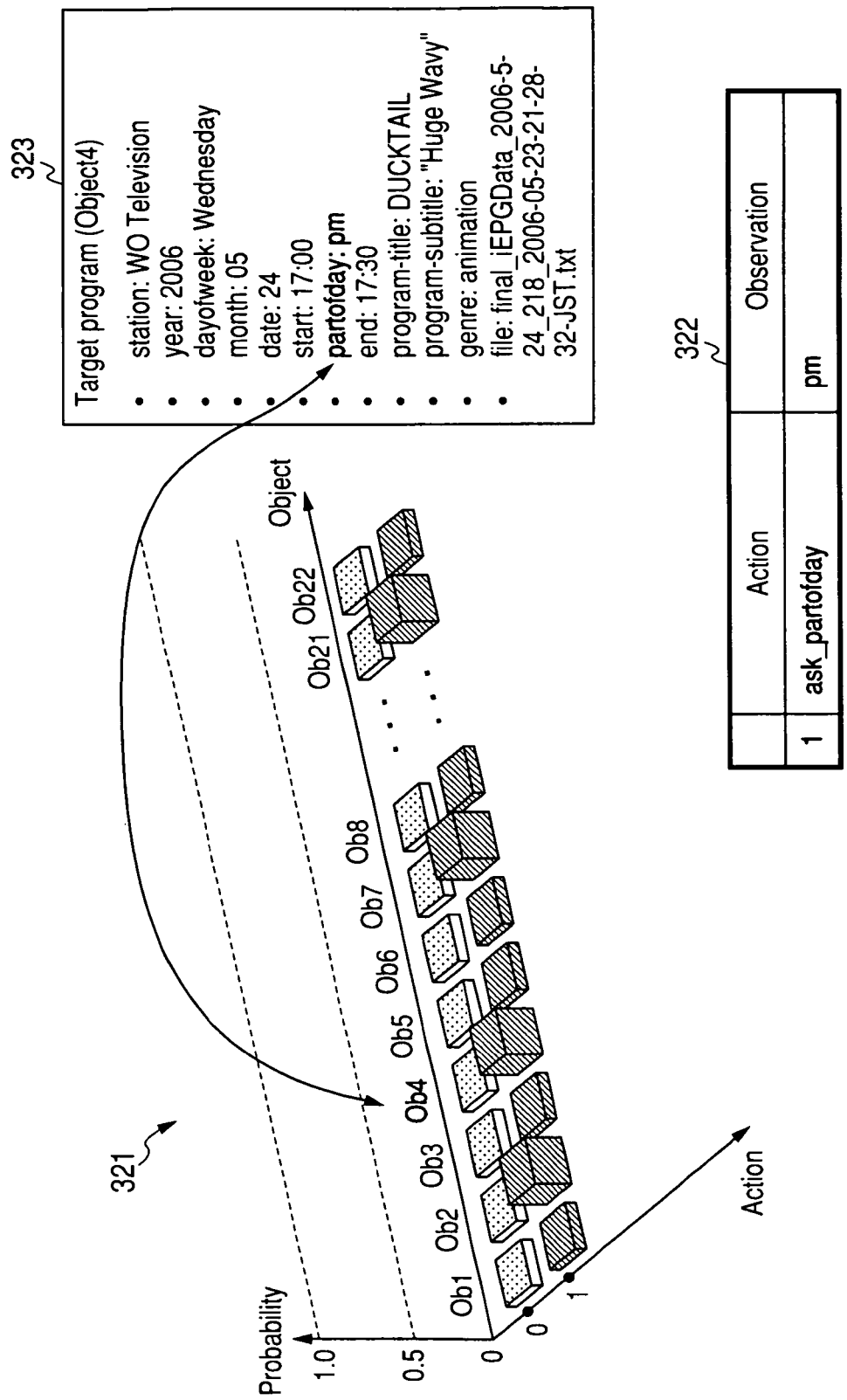

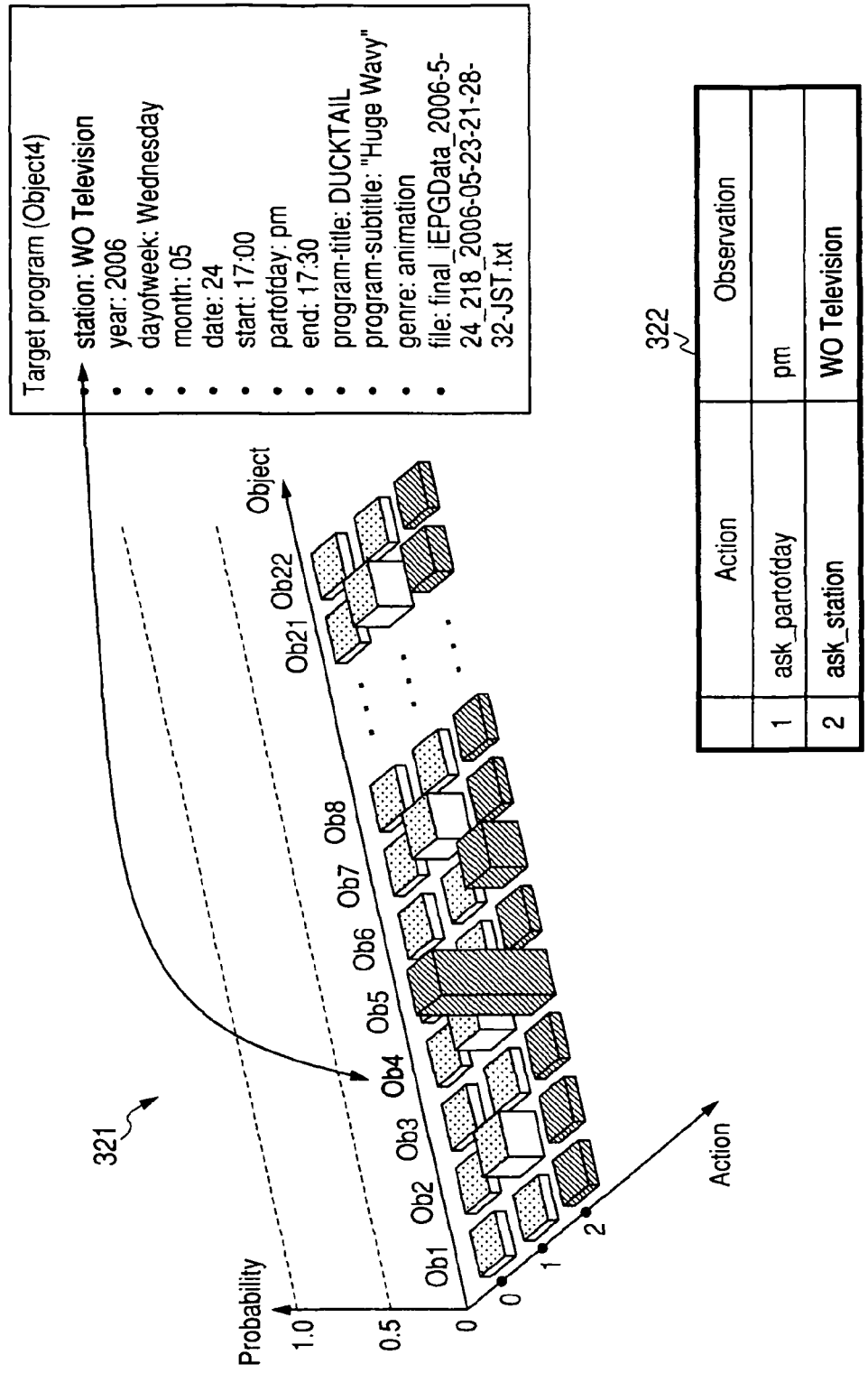

INFORMATION PROCESSING APPARATUS, INFORMATION PROCESSING METHOD AND COMPUTER PROGRAM

CROSS REFERENCES TO RELATED APPLICATIONS

The present invention contains subject matter related to Japanese Patent Applications JP 2007-020470 filed in the Japanese Patent Office on Jan. 31, 2007, the entire contents of which being incorporated herein by reference.

BACKGROUND OF THE INVENTION

1. Field of the Invention

The present invention relates to an information processing apparatus, an information processing method and a computer program. More specifically, the invention relates to an information processing apparatus, information processing method and computer program that creates a Partially Observable Markov Decision Process (POMDP) based on input data such as attribute data (attribute-value) having correspondence between attribute information and the value.

2. Description of the Related Art

As one of state estimation and action determination methods, processing has been known that applies a Partially Observable Markov Decision Process (POMDP). The outline of the partially observable Markov decision process (which will be called POMDP) will be described.

A POMDP is a method for performing state estimation and/or action determination by applying:

(a) state information (State space): S,
(b) action information (Action space): A,
(c) observation information (Observation space): O, and
(d) reward information (Reward space): R where those information pieces vary with the passage of time (t). State estimation and/or action determination is/are performed based on obtainable information and a definition function by defining a function of calculating a state transition probability, a function of calculating a reward and a function of calculating the probability of occurrence of an observation state.

The functions to be defined and used may include:
a state transition probability calculation function:

$$T(s_t, a_{t-1}, s_{t-1}) = P(s_t | a_{t-1}, s_{t-1})$$

of calculating a state transition probability from a state $S = s_{t-1}$ and an action $A = a_{t-1}$ of a time $T = (t-1)$ to the state $S = s_t$ of the next time $T = (t)$, a reward function:

$$R(s_t, a_t)$$

of calculating a reward from the state $S = s_t$ and action $A = a_t$ at the time $T(t)$, and
an observation state probability function:

$$O(s_t, a_{t-1}, o_{t-1}) = P(o_t | a_{t-1}, s_t)$$

of calculating the probability of occurrence of an observation state at the time $T = (t)$ from the action $A = a_{t-1}$ at the time $T = (t-1)$ and the state $S = s_t$ at the time $T = (t)$.

A POMDP is a method that performs state estimation and/or action determination processing by applying the information pieces and functions. A POMDP is applicable to the determination of various actions. For example, a POMDP may be applied to processing of determining an action determined as an optimum one from a few obtainable information pieces. More specifically, a POMDP is applicable to processing of determining an action of a robot, a simulation using a computer, data processing, and processing of determining an optimum action for running an enterprise.

With reference to FIG. 1, state estimation and/or action determination processing by a POMDP applying the information pieces above will be described. FIG. 1 shows the state $s_{t-1}$, action $a_{t-1}$, reward $R_{t-1}$, and observation $o_{t-1}$ at a time $T = t-1$ and the state $s_t$, action $a_t$, reward $R_t$ and observation $o_t$ at a subsequent time $T = t$. The arrows connecting the blocks indicate mutual influences. FIG. 1 shows that the information and/or state of the origin (parent) of each of the arrows may possibly influence on the state and/or information of the destination (child) of the arrow.

For example, at a time $T = t-1$,
the reward $R_{t-1}$ is obtained by the reward function: $R(s_{t-1}, a_{t-1})$ as described above based on the state $s_{t-1}$ and action $a_{t-1}$ at the time $T = t-1$.

The observation information $o_{t-1}$ may be observable information that varies with the change in state $s_{t-1}$, for example.

Those relationships are also true at all times $T = t-1, t, t+1$ and so on.

In the relationships at a different time, the relationship between the state $s_t$ at a time $T = t$ and the state $s_{t-1}$ and action $a_{t-1}$ at the time $T = t-1$ have correspondence based on the state transition probability calculation function:

$$T(s_t, a_{t-1}, s_{t-1}) = P(s_t | a_{t-1}, s_{t-1})$$

In other words, the probability of occurrence of the state $s_t$ at the time $T = t$ is calculated from the state $s_{t-1}$ and action $a_{t-1}$ at the previous time $T = t-1$. The relationship is typically satisfied during the period among serial event observation times.

In this way, a POMDP defines various information pieces (state, action, reward and observation information) in a target area including uncertainty and may estimate the state transition in the target area including uncertainty and/or determine a self-action based on a link among those information pieces. In the action determination processing, processing is performed of determining the action calculated as the one with the highest reward as an optimum action.

Notably, it is important in processing of constructing a POMDP to define the link among information pieces (such as state, action, reward and observation information) accurately, and a Bayesian Network is used for the processing. A Bayesian Network is a network including multiple nodes and defining the link among the nodes. The processing of creating and using a Bayesian Network is disclosed in US Patent Application Publications 2004/0220892 and 2002/0103793 (Patent Documents 1 and 2). Patent Documents 1 and 2 disclose processing for creating a Bayesian Network with high reliability, which defines the link among nodes accurately.

For example, as described above, in the POMDP model described with reference to FIG. 1, it is important to define various information pieces such as:

(a) state information (State space): S,
(b) action information (Action space): A,
(c) observation information (Observation space): O, and
(d) reward information (Reward space): R, and a function of calculating a state transition probability, a function of calculating a reward, a function of calculating the probability of occurrence of an observation state and so on, and special knowledge and experiences are important for the processing of constructing the POMDP model.

SUMMARY OF THE INVENTION

Accordingly, it is desirable to provide an information processing apparatus, information processing method and computer program that automatically create a Partially Observable Markov Decision Process (POMDP) from the input of attribute-value data having attribute information and the value, such as an Electronic Program Guide (EPG) transmitted by broadcast waves, for example.

According to an embodiment of the present invention, there is provided an information processing apparatus that constructs an information analysis processing configuration to be applied to information analysis processing in a target area including uncertainty, the apparatus including:

a data processing section that performs processing of automatically creating a Partially Observable Markov Decision Process (POMDP) model from the input of attribute data including attribute information and an attribute value; and a rule storage section storing a rule to be applied to processing of creating a Partially Observable Markov Decision Process (POMDP) in the data processing section, wherein the data processing section is configured to create a Partially Observable Markov Decision Process (POMDP) model by:

performing, as an action, processing of creating and outputting a question based on the attribute data;

obtaining the answer to the question as observation information; and performing processing of creating probability distribution information corresponding to an object based on the obtained observation information.

In the information processing apparatus, the data processing section may be configured to, in the processing of creating and outputting a question based on the attribute data, perform either guess action from which a specific object can be guessed based on the answer or other action excluding the guess action, and perform processing of creating probability distribution information corresponding to an object based on the rule according to the action.

In the information processing apparatus, the data processing section may be configured to, in the processing of creating and outputting a question based on the attribute data, perform either generic action applying the question created based on attribute information included in the attribute data or specific action applying the question created based on an attribute value included in the attribute data, and perform processing of creating probability distribution information corresponding to an object based on the rule according to the action.

In the information processing apparatus, the rule storage section may store at least one rule of rules defined in a Partially Observable Markov Decision Process (POMDP) including:

(1) a rule relating to a state transition function;
(2) a rule relating to an observation function;
(3) a rule relating to a reward function; and the data processing section may be configured to create a partially observable Markov Decision Process (POMDP) model by applying at least one rule of the rules relating to a state transition function, an observation function and a reward function.

In the information processing apparatus, the rule relating to an observation function may be a rule defining a probability value to be given to each objection based on observation information obtained as an answer corresponding to the question, that is, a rule defining each of:

a right answer observation probability value [OFr %];
a wrong answer observation probability value [OFw %]; and
an irrelevant answer observation probability value [OFir %].

In the information processing apparatus, the rule relating to an observation function is a rule defining the probability based on a result of an identity determination on a meaning that the question or answer has.

In the information processing apparatus, the rule relating to a state transition function may be a rule defining a probability [STdig %] that a change in state will not be caused by the implementation of an action excluding a guess action and a probability [STdigx %] that a change in state will not be caused by a guess action.

In the information processing apparatus, the rule relating to a reward function may be a rule defining a reward value defined correspondingly to each of:

in (A) a guess action,
(A1) a generic action; and
(A2) a specific action; and
in (B) other action,
(B1) a generic action; and
(B2) a specific action.

According to another embodiment of the invention, there is provided an information processing method that constructs an information analysis processing configuration to be applied to information analysis processing in a target area including uncertainty, the method including:

a data processing step of performing processing of automatically creating a Partially Observable Markov Decision Process (POMDP) model from the input of attribute data including attribute information and an attribute value by a data processing section, wherein the data processing step has:

an action step of performing, as an action, processing of creating and outputting a question based on the attribute data;

an observation information obtaining step of obtaining the answer to the question as observation information; and a step of, based on a rule recorded in a rule storage section, performing processing of creating probability distribution information corresponding to an object based on the obtained observation information and creating a Partially Observable Markov Decision Process (POMDP) model.

According to another embodiment of the invention, there is provided a computer program that causes an information processing apparatus to construct an information analysis processing configuration to be applied to information analysis processing in a target area including uncertainty. The program includes:

a data processing step of inputting attribute data including attribute information and an attribute value to a data processing section and performing processing of automatically creating a Partially Observable Markov Decision Process (POMDP) model, wherein the data processing step has:

an action step of causing to perform, as an action, processing of creating and outputting a question based on the attribute data;

an observation information obtaining step of causing to obtain the answer to the question as observation information; and a step of, based on a rule recorded in a rule storage section, causing to perform processing of creating probability distribution information corresponding to an object based on the obtained observation information and create a Partially Observable Markov Decision Process (POMDP) model.

The computer program according to an embodiment of the invention is a computer program that can be provided to a computer system, which can execute various program codes, for example, through a computer readable storage medium or a communication medium, for example, a recording medium such as a CD, an FD and an MO or a communication medium such as a network. Providing a program in a computer-readable manner allows implementation of processing according to the program on a computer system.

The other objects, features and advantages of the invention will be apparent from more detailed descriptions based on embodiments of the invention and accompanying drawings, which will be described later. A system in this specification includes a logical set of multiple apparatus, and the component apparatus are not limitedly placed within one same cabinet.

With configurations according to the embodiments of the invention, a Partially Observable Markov Decision Process (POMDP) can be automatically created from the input of attribute-value data having attribute information and the value, such as an Electronic Program Guide (EPG), which may be transmitted by broadcast waves, for example. For example, a Partially Observable Markov Decision Process (POMDP) model can be created automatically by performing, as an action, processing of creating and outputting a question based on attribute data, obtaining the answer to the question as observation information, and performing processing of creating probability distribution information corresponding to an object based on the obtained observation information.

BRIEF DESCRIPTION OF THE DRAWINGS

FIG. 2 is a diagram illustrating a configuration example of attribute data;

FIG. 4 is a diagram illustrating a configuration and processing of an information processing apparatus according to an embodiment of the invention;

FIGS. 7A and 7B are diagrams illustrating processing of creating an observation function rule;

FIGS. 8A and 8B are diagrams illustrating processing of creating an observation function rule;

FIG. 9 is a diagram illustrating a POMDP creating processing example to be performed by an information processing apparatus according to an embodiment of the invention;

FIG. 10 is a diagram illustrating a POMDP creating processing example to be performed by an information processing apparatus according to an embodiment of the invention;

DESCRIPTION OF THE PREFERRED EMBODIMENTS

With reference to drawings, details of an information processing apparatus, information processing method and computer program according to embodiments of the invention will be described.

An information processing apparatus according to an embodiment of the invention automatically creates a Partially Observable Markov Decision Process (POMDP) based on attribute data (Attribute-Value). One data piece such as attribute data (Attribute-Value) including set information including attribute information describing an attribute and the value is input to an information processing apparatus according to an embodiment of the invention, and the information processing apparatus automatically creates a POMDP based on the input data.

Various data may be the attribute data applicable as the data for creating a POMDP, but an example of processing of creating a POMDP by using a data set included in an Electronic Program Guide (EPG) transmitted by broadcast waves will be described in the embodiments below.

Recent television broadcasting may transmit digital data and may provide not only broadcast contents but also an electronic program guide (EPG) as program information by using broadcast waves. The EPG includes the broadcast date, title, performers and other program information of a program as attribute information of the program. FIG. 2 shows a configuration example of partial data of the EPG.

EPG data includes, as shown in FIG. 2, an attribute (Attribute) describing the attribute of data and the value (Value) and includes data pieces having a construction [Attribute: Value] as below:

station: Television ABC
year: 2006
month: 05
date: 11
start: 13:30
end: 15:30
program-title: MOVIE "PRETTY LEAGUE"
program-subtitle:
genre: 80
subgenre: 144
. . .

An attribute data set including an attribute and the value is input to an information processing apparatus according to an embodiment of the invention, and the information processing apparatus automatically creates a POMDP.

Figure 3:
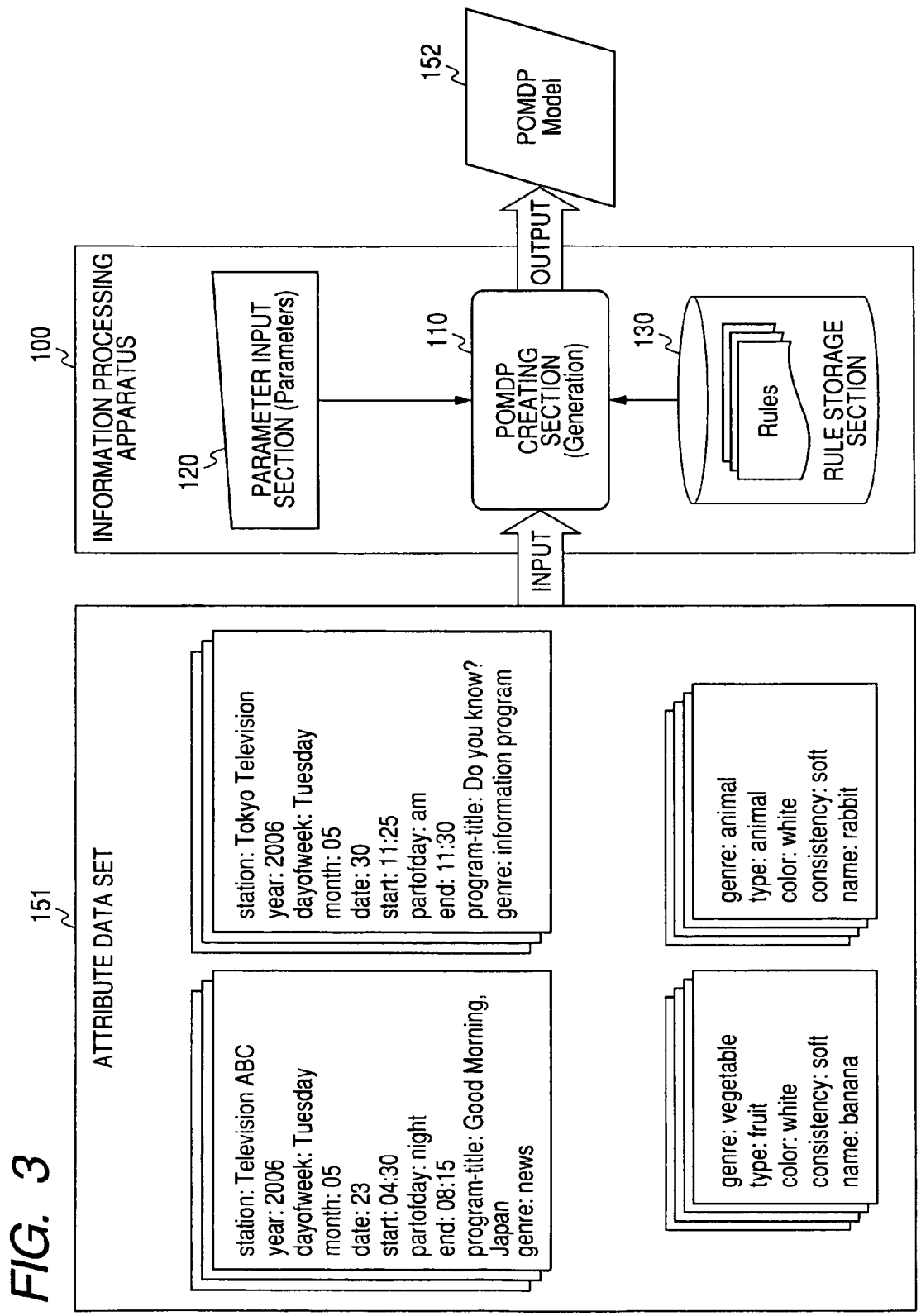
FIG. 3 is a diagram illustrating a configuration and processing of an information processing apparatus according to an embodiment of the invention.

With reference to FIG. 3 and subsequent drawings, an example of the processing of creating a POMDP in an information processing apparatus according to an embodiment of the invention will be described. An information processing apparatus 100 shown in FIG. 3 includes a POMDP creating section 110, a parameter input section 120 and a rule storage section 130. Attribute data described with reference to FIG. 2, that is, attribute data 151 defining attribute information and the value corresponding to the attribute information is input to the POMDP creating section 110, as described above.

Figure 1:
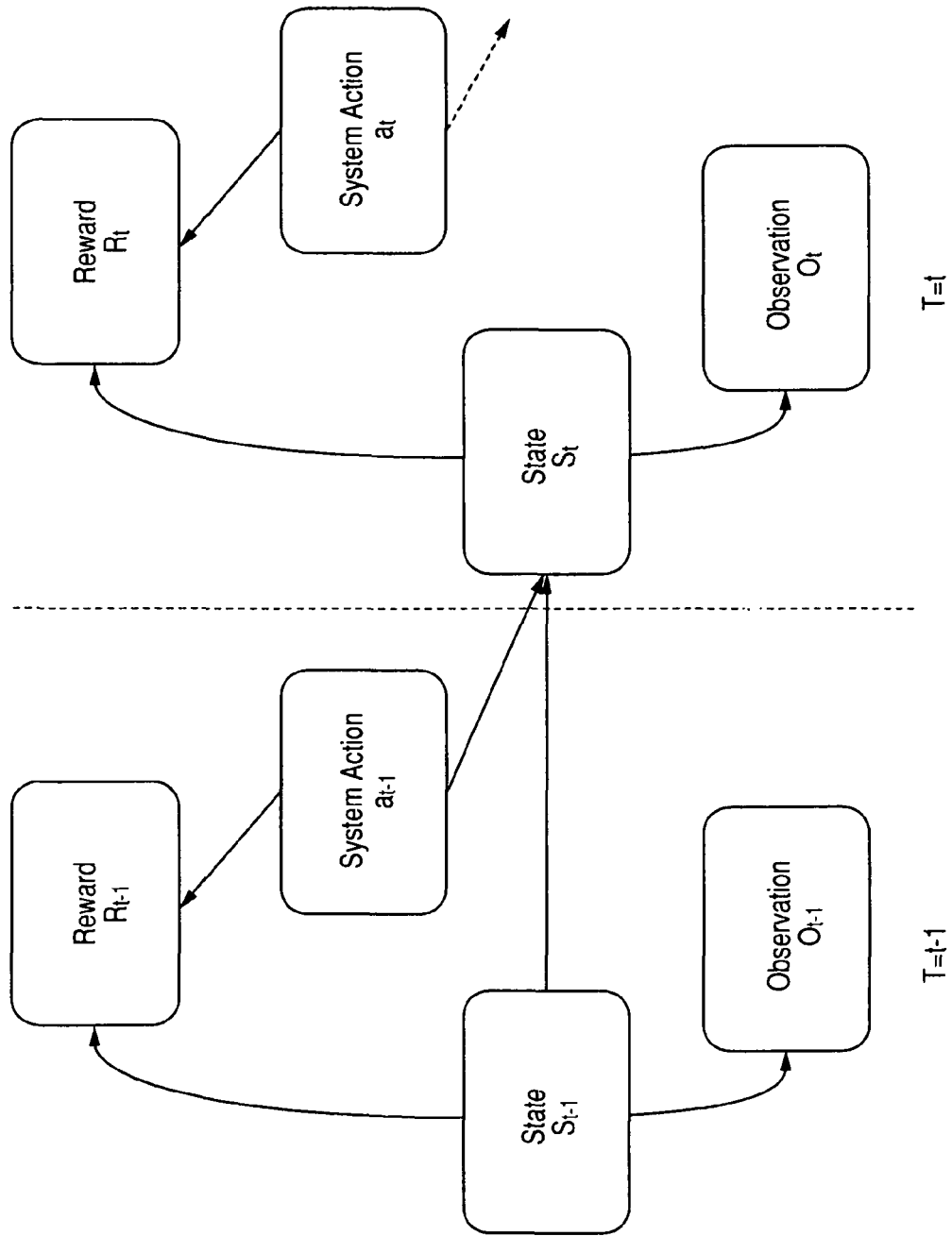
FIG. 1 is a diagram illustrating a POMDP.

The POMDP creating section 110 analyzes the input attribute data 151 and creates and outputs a POMDP model 152 by applying a parameter to be input from the parameter input section 120 and a rule stored in the rule storage section 130. As described above with reference to FIG. 1, the POMDP model 152 is a model defining various information pieces such as:

(a) state information (State Space): S
(b) action information (Action Space): A
(c) observation information (Observation Space): O and
(d) reward information (Reward Space): R, and a function of calculating a state transition probability, a function of calculating a reward, a function of calculating the probability of occurrence of an observation state and so on.

With reference to FIG. 4, an example of the processing of creating a POMDP in the POMDP creating section 110 will be described. First, attribute data 201 including an attribute (Attribute) and the value (Value) of the attribute described with reference to FIG. 2 is defined as state information (State Space) 211.

The information processing apparatus creates and implements action information 212 based on the state information (State Space) 211. In this example, as the action information (Action Space) 212, processing of creating and outputting a question based on the attribute data 201 is performed. The information processing apparatus receives the input of an answer to the question and handles it as observation information (Observation Space) 213.

The questions created as the action information may be categorized into two categories below:

(A) a guess action; and
(B) other action.

As specific action forms of the guess action and non-guess action, two actions:

(1) a generic action; and
(2) a specific action are defined.

In other words, the (A) guess action includes:

(A1) a generic action; and
(A2) a specific action.

The (B) other action includes:

(B1) a generic action; and
(B2) a specific action.

The (A) guess action is an action (question) that guesses one object. An object is EPG data corresponding to a specific program (title) in this embodiment. For example, the question, "Program-title is Ohayou Nippon?"

corresponds to the guess action. The object (EPG data) with the program title "Ohayou Nippon" corresponds to the shown attribute data 201, and the question that guesses one specific object is defined as a guess action.

The action that is not the (A) guess action is (B) other action, which is an action (question) that does not guess one object.

The (1) generic action is a question to be created based on attribute information (Attribute) in the attribute data 201. For example, the question, "Which station?"

corresponds to the generic action. The question is created based on the attribute information (Attribute) in the attribute data 201 and is a question that expects the attribute value as the answer.

The (2) specific action is a question to be created based on the value (Value) in the attribute data 201. For example, the question, "Station is Television ABC?"

corresponds to the specific action. The question is created based on the value (Value) in the attribute data 201 and is a question that expects whether the attribute value (Value) included in the question is right or not as the answer.

As described above, the (1) generic action, and
(2) specific action are applicable to both of the (A) guess action, and
(B) other action.

Answers to those various questions are input to the information processing apparatus, which then defines them as observation information 203. The observation information is observation data obtained correspondingly to one action (creating and outputting a question). For example, as shown in FIG. 4, the answers such as:

"Television ABC"; and
"Yes, No or Other"

may be input and be handled as observation information.

The information processing apparatus defines the attribute data 201 as state information (State Space) 211 in this way, and the action information 212 of either:

(1) generic action; or
(2) specific action is defined and executed as the action information 212 based on the attribute data 201. Then, the answer based on the action is obtained as the observation information 213. The information processing apparatus creates and outputs various questions based on the attribute data 201 and performs the processing of inputting answers to the questions.

The types of answers to questions can be categorized to following three subsets of:

(1) right answer (RA);
(2) wrong answer (WA); and
(3) irrelevant answer (IrA)

and are obtained as the observation information 213. The (1) right answer (RA) and (2) wrong answer (WA) are interpreted as a relevant answer.

The POMDP creating section 110 shown in FIG. 3 performs processing that applies a parameter supplied from the parameter input section 120 and a rule prestored in the rule storage section 130, as shown in FIG. 3, for performing the processing of creating a POMDP through the question creation and answer input.

The rules to be input may include:

a rule (1) relating to a state transition function,
a rule (2) relating to an observation function, and
a rule (3) relating to a reward function.

The rule relating to a reward function is a rule for determining the value of a reward based on one action or observation information. With reference to FIGS. 5A to 6B, the rules (1) and (2) relating to a state transition function and an observation function will be described.

The rule relating to a state transition function is a rule for defining the probability that an initial state (s) will be a final state (s') through an action (a).

Figures 5A, 5B:
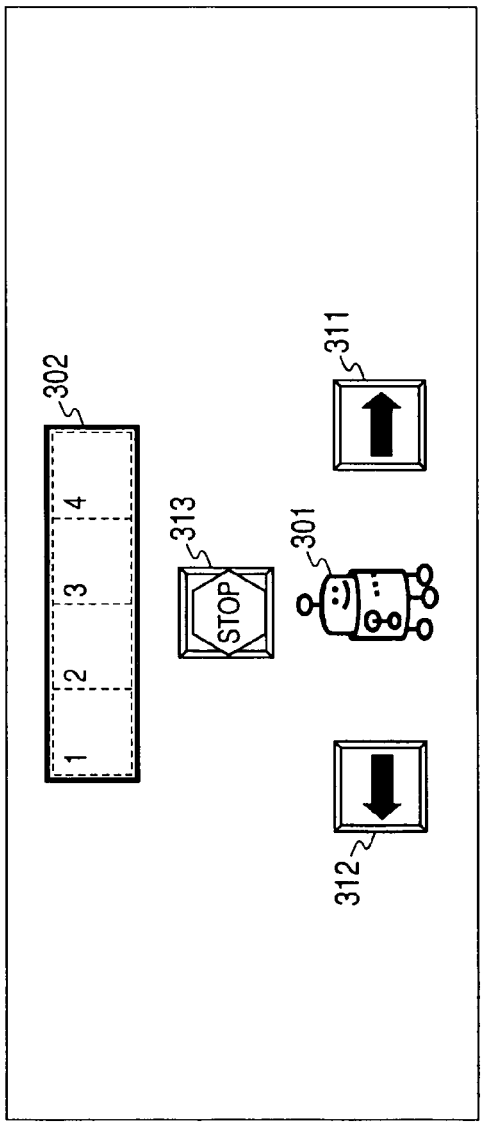
FIGS. 5A and 5B are diagrams illustrating a state transition function.

For example, a robot 301 shown in FIG. 5A implements an action based on the assumption that the robot 301 exists in one of areas [1] to [4] of an area 302. The action may be one of:

a right movement action 311;
a left movement action 312; and
a stop action 313, as shown in FIG. 5A.

FIG. 5B shows the probabilities expressing the occurrence relationship between the initial state (s) and the final state (s') in a case where an action (a) is performed.

The table (2-1) is correspondence probabilities between initial states (s) and final states (s') in cases where right movement actions are performed.

The table (2-2) is correspondence probabilities between initial states (s) and final states (s') in cases where left movement actions are performed.

The table (2-3) is correspondence probabilities between initial states (s) and final states (s') in cases where stop actions are performed.

On the table (2-1) showing correspondence probabilities between initial states (s) and final states (s') in cases right movement actions are performed, the position of the robot at the final state (s') resulting from a right movement action in a case where the initial state (s) of the robot 301 is at an area [1] is expressed by the probability distribution:

Area [1]: 0.1,
Area [2]: 0.9,
Area [3]: 0.0, and
Area [4]: 0.0

In this way, the rule defining the probability of the transition from one initial state (s) to a state (s') based on one action (a) is a rule relating to a state transition function.

Next, with reference to FIGS. 6A and 6B, a rule relating to an observation function will be described. A rule relating to an observation function is a rule defining the probability of occurrence of observation information (O) to be observed in a case where an action (a) is caused at one initial state (s).

Figures 6A, 6B:
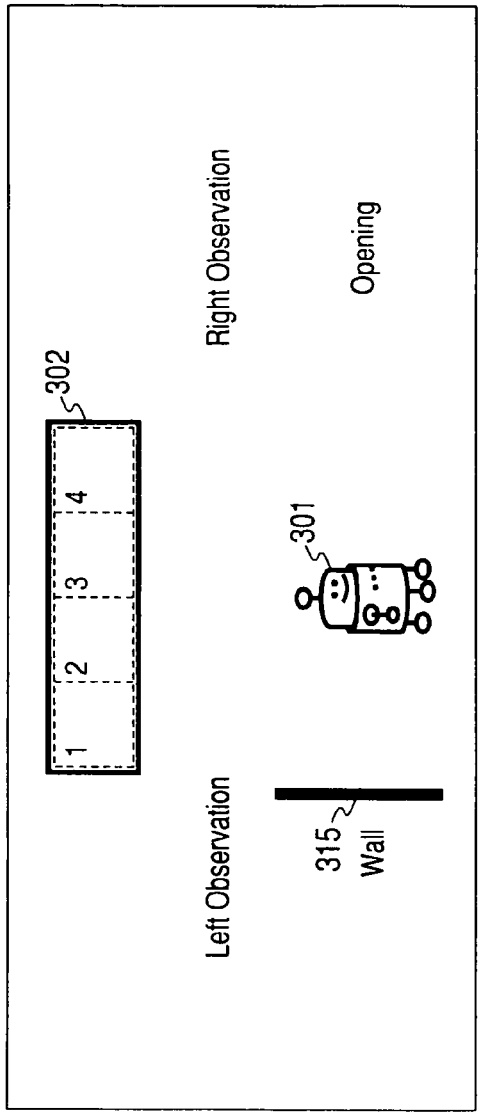
FIGS. 6A and 6B are diagrams illustrating an observation function.

For example, a robot 301 shown in FIG. 6A exists in one of the areas [1] to [4] of the area 302. There is a wall 315 on the left side. FIG. 6B shows probability values, which are correspondences between initial states (s) and observation information (O) in a case where a right movement action (a) is performed here.

According to the correspondence probability values between initial states (s) and observation information (O) in a case where a right movement action is performed, the probability values (O) of the information to be observed from the implementation of the right movement action from the initial state (s) of the robot 301 at the area [1], for example, are:

a wall on the left side (L_Wall)=0.9,
open on the left side (L_Opening)=0.1,
a wall on the right side (R_Wall)=0.1, and
open on the right side (R_Opening)=0.9

Notably, the observation information corresponds to the information to be observed by the robot 301 in a case where the robot 301 is moved to the area [2] as a result of the implementation of a right movement action from the initial state (s) of the robot 301 at the area [1].

In this way, the rule defining the probabilities of the information (O) to be observed at a state (s') changed from one initial state (s) based on one action (a) is the rule relating to an observation function.

The POMDP creating section 110 in the information processing apparatus 100 shown in FIG. 3 performs, as described above, the POMDP creating processing applying at least one of the rules:

a rule (1) relating to a state transition function,
a rule (2) relating to an observation function, and
a rule (3) relating to a reward function.

These rules are pre-registered with the rule storage section 130. More specific examples of the rules applying the POMDP creating processing in this embodiment will be described. For example, this embodiment applies four rules of (Rule 1), (Rule 2), (Rule 3) and (Rule 4).

Rule 1 and Rule 2 are rules relating to a state transition function and define that:

under (Rule 1),
the probability that the state will not be changed by the implementation of an action that is not a guess action is [STdig %]; and
under (Rule 2),
the probability that the state will not be changed by the implementation of a guess action is [STdigx %].

Rule 3 is a rule relating to an observation function. As described above, the information processing apparatus creates and outputs various questions as actions and handles the answers as observation information. The answers to be obtained as observation information can be categorized into three types of:

right answer;
wrong answer; and
irrelevant answer.

Rule 3 is a rule defining observation function probability values defined correspondingly to those answers, that is, observation data.

Rule 3 defines:

a predetermined right answer observation probability value [OFr %] to a right answer;
a predetermined wrong answer observation probability value [OFw %] to a wrong answer; and
a predetermined irrelevant answer observation probability value [OFir %] to other irrelevant answers.

For example, Rule 3 specifically defines that:

the right answer observation probability value [OFr %]=85%;
the wrong answer observation probability value [OFw %]=10%; and
the irrelevant answer observation probability value [OFir %]=5%.

Notably, the number of right answers to one action (question) is not limited to one though the categorization into the types of right answer, wrong answer and irrelevant answer as described above is important where a rule relating to an observation function is defined. In other words, multiple different answers may have an identical meaning. In some cases, different actions (questions) may be questions having an identical meaning.

For example, the answers to be obtained to the actions (questions):

What day of the week {day of week}; and
What day of the year {day, month, year} are a date and a day of the week. In this case, it is important to implement the categorization including the interpretation on meanings to define observation probability values for the categorization of answers, such as relevant and irrelevant answers and right and wrong answers.

For example, FIG. 7A shows a definition example of the observation function rule corresponding to an action (a):

"Is the day the 19th?"

In this case, the right answer observation probability value [OFr %]=85%;
the wrong answer observation probability value [OFw %]=10%; and
the irrelevant answer observation probability value [OFir %]=5%.

For example, in a case where EPG-A is a program on the day 19th, the observation function rule defines:

the right answer observation probability value [OFr %]=85% for answers [Yes] and [19], which are observation information;

the wrong answer observation probability value [OFw %]=10% for answers [No] and [18]; and the irrelevant answer observation probability value [OFir %]=5% for other answers.

In a case where EPG-B is a program on the day 18th, the observation function rule defines:

the right answer observation probability value [OFr %]=85% for answers [No] and [18], which are observation information;

the wrong answer observation probability value [OFw %]=10% for answers [Yes] and [19]; and the irrelevant answer observation probability value [OFir %]=5% for other answers.

However, in a case where the day 19th defined in the question is Friday, May 19, 2006 and the EPG-A is a program on the day 19th, the answers:

Friday (observation information), and

Thursday (observation information)

are not preferably handled as the same noise, that is, irrelevant answers to the question:

"Is the day the 19th?"

Therefore, as shown in FIG. 7B, for the EPG-A, which is a program on the day 19th (Friday), answers:

[Friday] in addition to the answers [Yes] and [19], which are observation information, are defined for the right answer observation probability value [OFr %]=85%. For the EPG-B, which is a program on the day 18th (Thursday), answers [No], [18] and [Thursday], which are observation information, are defined for the right answer observation probability value [OFr %]=85% to the question:

"Is the day the 19th?"

Through this routine, the processing on observation information is performed accurately.

FIG. 8A shows a definition example of the observation function rule corresponding to an action (a):

"What day of the week?"

In this case, the right answer observation probability value [OFr %]=85%;

the wrong answer observation probability value [OFw %]=10%; and the irrelevant answer observation probability value [OFir %]=5%.

For example, in a case where EPG-A is a program on the day 19th (Friday), the observation function rule defines that:

the right answer observation probability value [OFr %]=85% for the answer [Friday], which is observation information;

the wrong answer observation probability value [OFw %]=10% for the answer [Thursday]; and the irrelevant answer observation probability value [OFir %]=5% for other answers.

In a case where the EPG-B is a program on the day 18th (Thursday), the observation function rule defines that:

the right answer observation probability value [OFr %]=85% for the answer [Thursday], which is observation information;

the wrong answer observation probability value [OFw %]=10% for the answer [Friday]; and the irrelevant answer observation probability value [OFir %]=5% for other answers.

Also in these cases, the date may be input as the observation information (answer) to the defined question, "What day of the week?"

In a case where the day 19th is of Friday, May 19, 2006 and the EPG-A is a program on the day 19th, the answers:

18 (observation information), and 19 (observation information)

are not preferably handled as the same noise, that is, irrelevant answers.

Therefore, as shown in FIG. 8B, for the EPG-A, which is a program on the day 19th (Friday), the answer [19] in addition to the answer [Friday], which is observation information, is defined for the right answer observation probability value [OFr %]=85%. For the EPG-B, which is a program on the day 18th (Thursday), the answer [18] in addition to the answer [Thursday], which is observation information, are defined for the right answer observation probability value [OFr %]=85% to the question:

"What day of the week?"

Through this routine, the processing on observation information is performed accurately.

Rule 4 is a rule relating to a reward function. The rule is a rule defining a reward value defined correspondingly to each of:

in (A) a guess action, (A1) a generic action, and (A2) a specific action, and in (B) other action, (B1) a generic action, and (B2) a specific action as described above.

More specifically, the rule defines:

in (A) a guess action, the reward value for (A1) a generic action as [RWgx];

the reward value in a case where an answer, which is relevant to (A2) a specific action, is obtained as [RWpx]; and the reward value in a case where an answer, which is not relevant to (A2) a specific action, is obtained as [RWnpx].

The rule further defines:

in (B) other action, the reward value for (B1) a generic action as [RWg];

the reward value in a case where an answer, which is relevant to (B2) a specific action, is obtained as [RWp]; and the reward value in a case where an answer, which is not relevant to (B2) a specific action, is obtained as [Rwnp].

Next, with reference to FIG. 9 and subsequent drawings, processing of automatically creating a Partially Observable Markov Decision Process (POMDP) and application configurations in an information processing apparatus according to an embodiment of the invention will be described.

The processing of creating and using a POMDP, which is illustrated in FIG. 9 and subsequent drawings is processing of creating a POMDP from the input of attribute data of an EPG program corresponding to one program, that is, the attribute data including an attribute and the value, which has been described above with reference to FIG. 2 and so on, implementing an action, that is, a question and obtaining the answer to the question as observation information, defining probability values for various objects (programs) based on predefined rules (such as Rules 1 to 4 as described above) based on th observation information, and finally guessing the input EPG program.

The graph 321 shown in FIG. 9 is an object correspondence probability distribution graph 321 as probability value distribution data for objects created through the processing above. The multiple objects Ob1 to Ob22 and so on are EPGs corresponding to different programs in this example. The Action axis expresses the number of actions, that is, questions, to be executed. The vertical axis (Probability) expresses the probabilities of objects obtained by applying the rules based on observation information to the questions and expresses the probability that an input EPG will be Object 1 to Object 22 (Ob1 to Ob22).

The initial state is at the part [0] on the Action axis, and the probabilities for Ob1 to Ob22 at the initial state are all equally flat.

The correspondence data between the first action and the observation information (Observation) corresponding to the action is action-observation information 322. That is, the action-observation information 322 describes that:

observation information=pm is obtained as the observation information (Observation) to:

Action=Which part of a day? {ask_partofday}

The POMDP creating section of the information processing apparatus defines probability values of:

a right answer observation probability value [OFr %];

a wrong answer observation probability value [OFw %]; and an irrelevant answer observation probability value [OFir %] to objects based on the observation information and by applying the rules. The specific values of those probability values are predefined. For example, the right answer observation probability value [OFr %]=85%;

the wrong answer observation probability value [OFw %]=10%; and the irrelevant answer observation probability value [OFir %]=5%.

The defined probability values are data indicated on the line corresponding to the number [1] on Action axis of the probability distribution graph 321 shown in FIG. 9. The probability values for the objects Ob2, Ob4, Ob7, and Ob21, for example, are defined higher, and these objects are objects with the right answer observation probability value [OFr %] for:

observation information (observation)=pm to:

Action=Which part of a day? {ask_partofday}

Here, the input EPG to be analyzed is the shown EPG program 323 and corresponds to Object 4 (Ob4). Naturally, the probability graph corresponding to Action=1 of Object 4 (Ob4) on the probability distribution graph 321 is also defined higher. Multiple high probability values are defined to other objects since other pm programs exist.

FIG. 10 shows an example of the processing of obtaining observation information and creating a probability distribution graph based on the second action. As described by the action-observation information 322, the second action is:

Action=Which television station? {ask_station}, and observation information=WO television is obtained as the observation information (Observation).

The POMDP creating section of the information processing apparatus defines probability values of:

a right answer observation probability value [OFr %];

a wrong answer observation probability value [OFw %]; and an irrelevant answer observation probability value [OFir %]

to the objects based on the observation information and by applying the rules. The defined probability values are data indicated on the line corresponding to the number [2] on Action axis of the probability distribution graph 321 shown in FIG. 10. The probability values for the objects Ob4 and Ob6, for example, are defined higher. These objects are objects with higher probability values defined based on the rule that determines the distribution of probability values (that is, the rule corresponding to an observation function).

Figure 11:
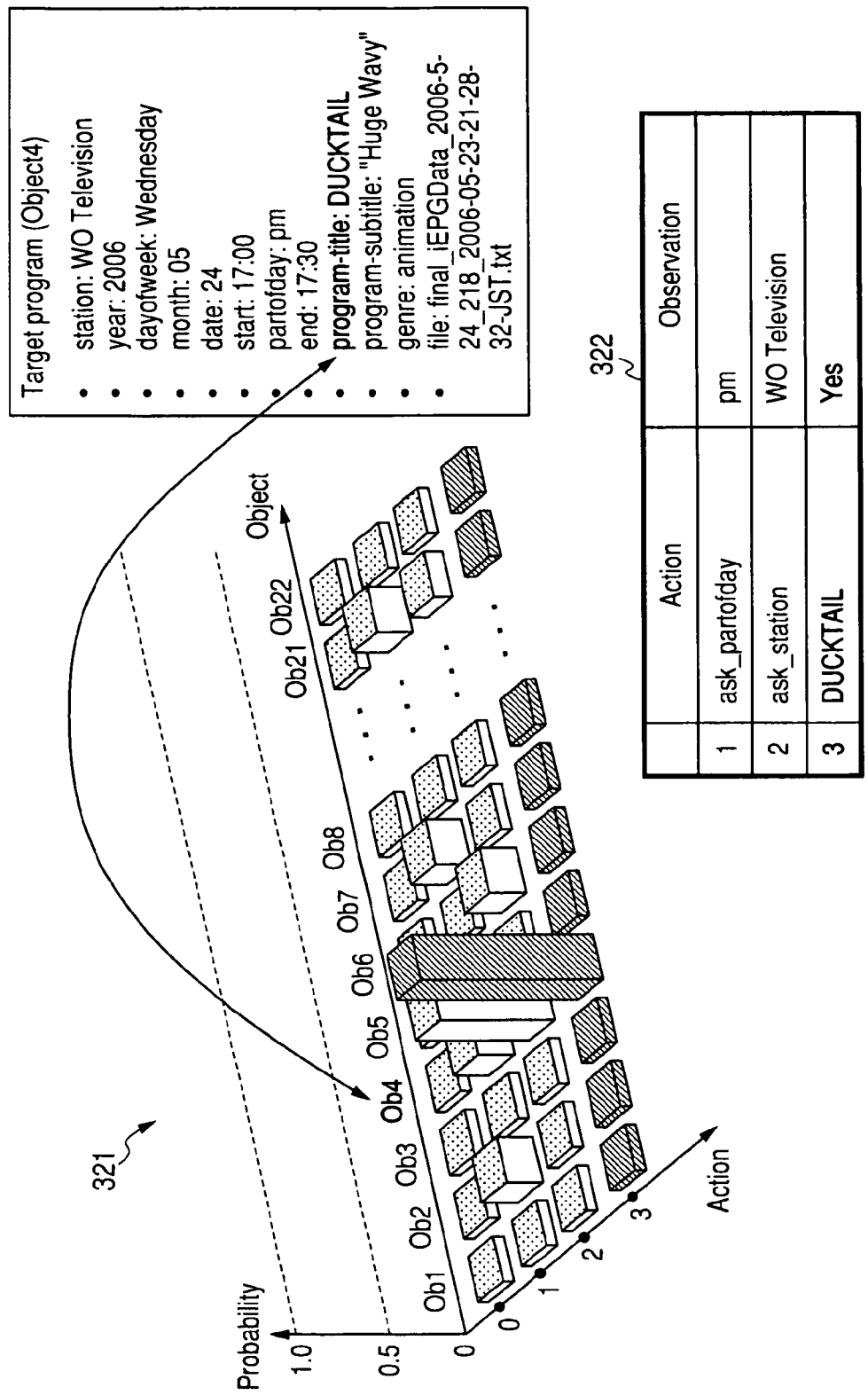
FIG. 11 is a diagram illustrating a POMDP creating processing example to be performed by an information processing apparatus according to an embodiment of the invention.

FIG. 11 shows an example of the processing of obtaining observation information and creating a probability distribution graph based on the third action. As described by the action-observation information 322, the third action is:

Action=Is the program "DUCKTAIL"?, and observation information=Yes is obtained as the observation information (Observation).

The POMDP creating section of the information processing apparatus defines probability values of:

a right answer observation probability value [OFr %];

a wrong answer observation probability value [OFw %]; and an irrelevant answer observation probability value [OFir %]

to the objects based on the observation information and by applying the rules. The defined probability values are data indicated on the line corresponding to the number [3] on Action axis of the probability distribution graph 321 shown in FIG. 11. The probability value for the object Ob4, for example, is defined higher. The object is an object with higher probability values defined based on the rule that determines the distribution of probability values (that is, the rule corresponding to an observation function).

Through this processing, the object with the highest probability value is determined as the target program from the probability distribution among the objects on the probability distribution graph 321, which allows the determination that the input EPG program is Object 4 (Ob4).

Figure 12:
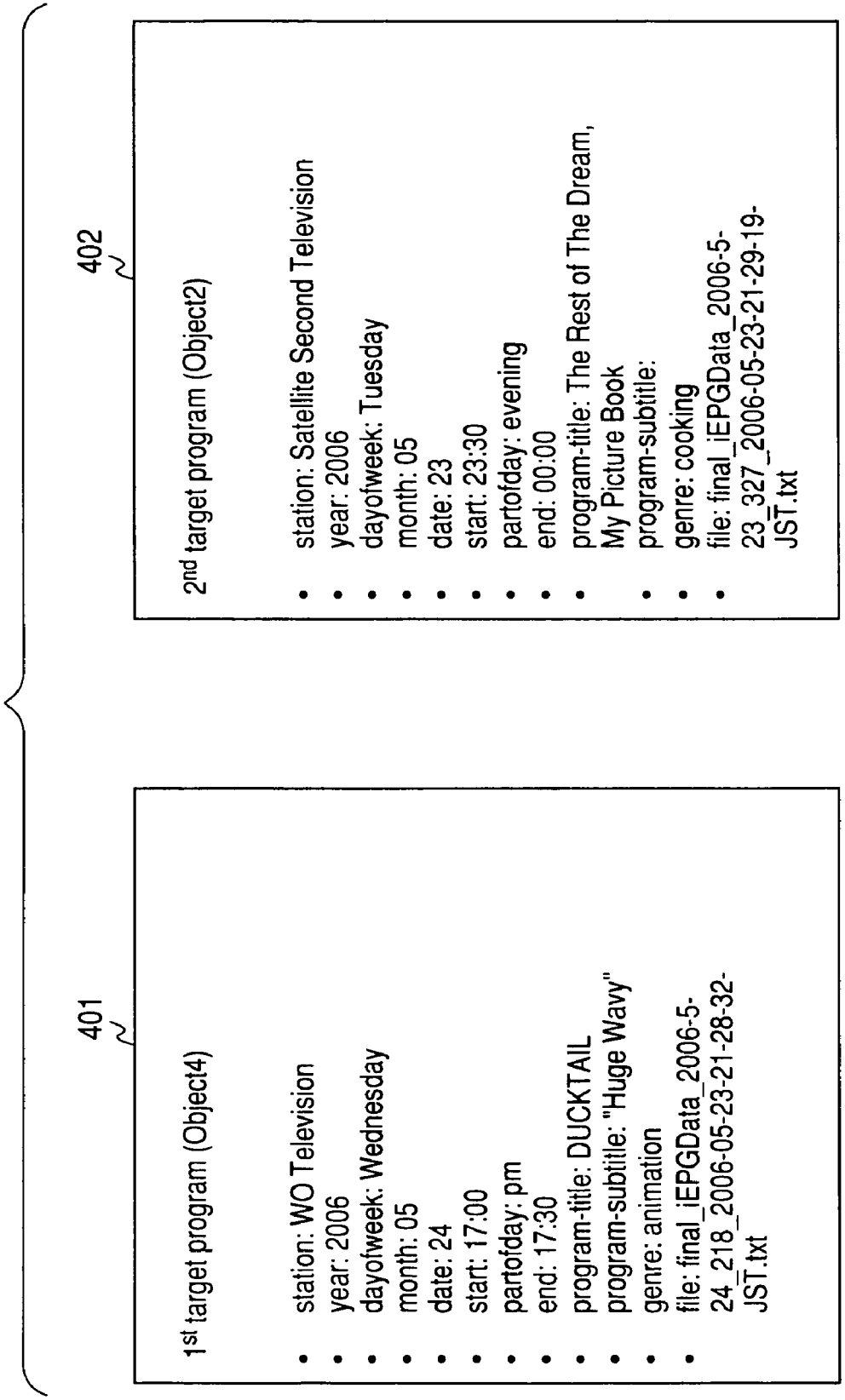
FIG. 12 is a diagram illustrating a POMDP creating processing example to be performed by an information processing apparatus according to an embodiment of the invention.

The processing examples in FIGS. 9 to 11 are examples in the case where one object (EPG program) is to be searched as a target, but processing of searching multiple objects as search targets is also possible. With reference to FIG. 12 and subsequent drawings, a processing example in which multiple objects are searched as targets will be described.

FIG. 12 shows EPG programs 401 and 402 corresponding to two different programs. The two programs are assumed as target programs to be searched.

Figure 13:
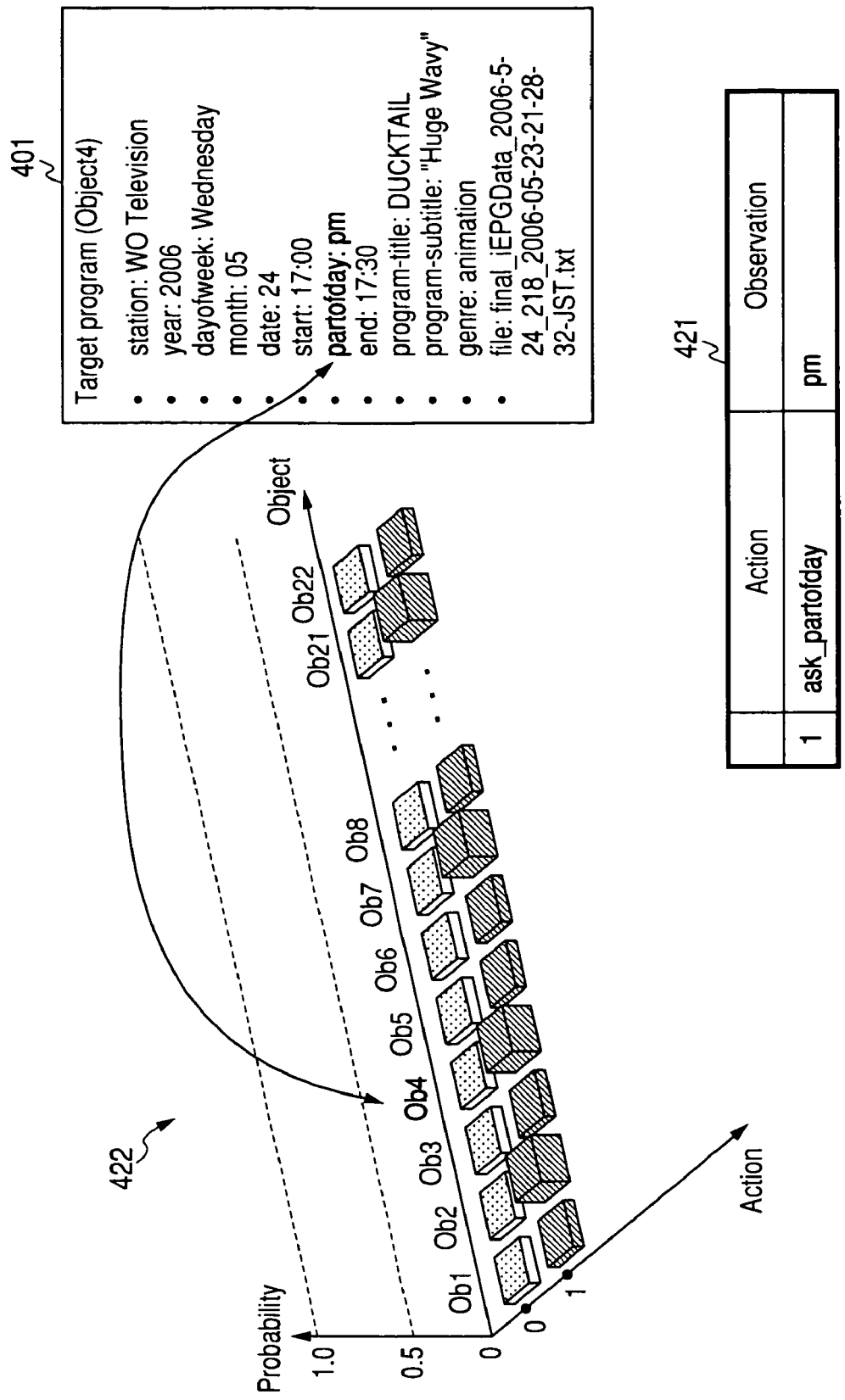
FIG. 13 is a diagram illustrating a POMDP creating processing example to be performed by an information processing apparatus according to an embodiment of the invention.

FIG. 13 shows an example of the processing of obtaining observation information and creating a probability distribution graph 422 based on the first action. As described by action-observation information 421, the first action is:

Action=Which part of a day? {ask_partofday}, and observation information=pm is obtained as the observation information (Observation) to the action.

The POMDP creating section of the information processing apparatus defines probability values of:

a right answer observation probability value [OFr %];

a wrong answer observation probability value [OFw %]; and an irrelevant answer observation probability value [OFir %]

to objects based on the observation information and by applying the rules. The defined probability values are data indicated on the line corresponding to the number [1] on Action axis of the probability distribution graph 422 shown in FIG. 13. The probability values for the objects Ob2, Ob4, Ob7, and Ob21, for example, are defined higher. These objects are objects with higher probability values defined based on the rule that determines the distribution of probability values (that is, the rule corresponding to an observation function).

Figure 14:
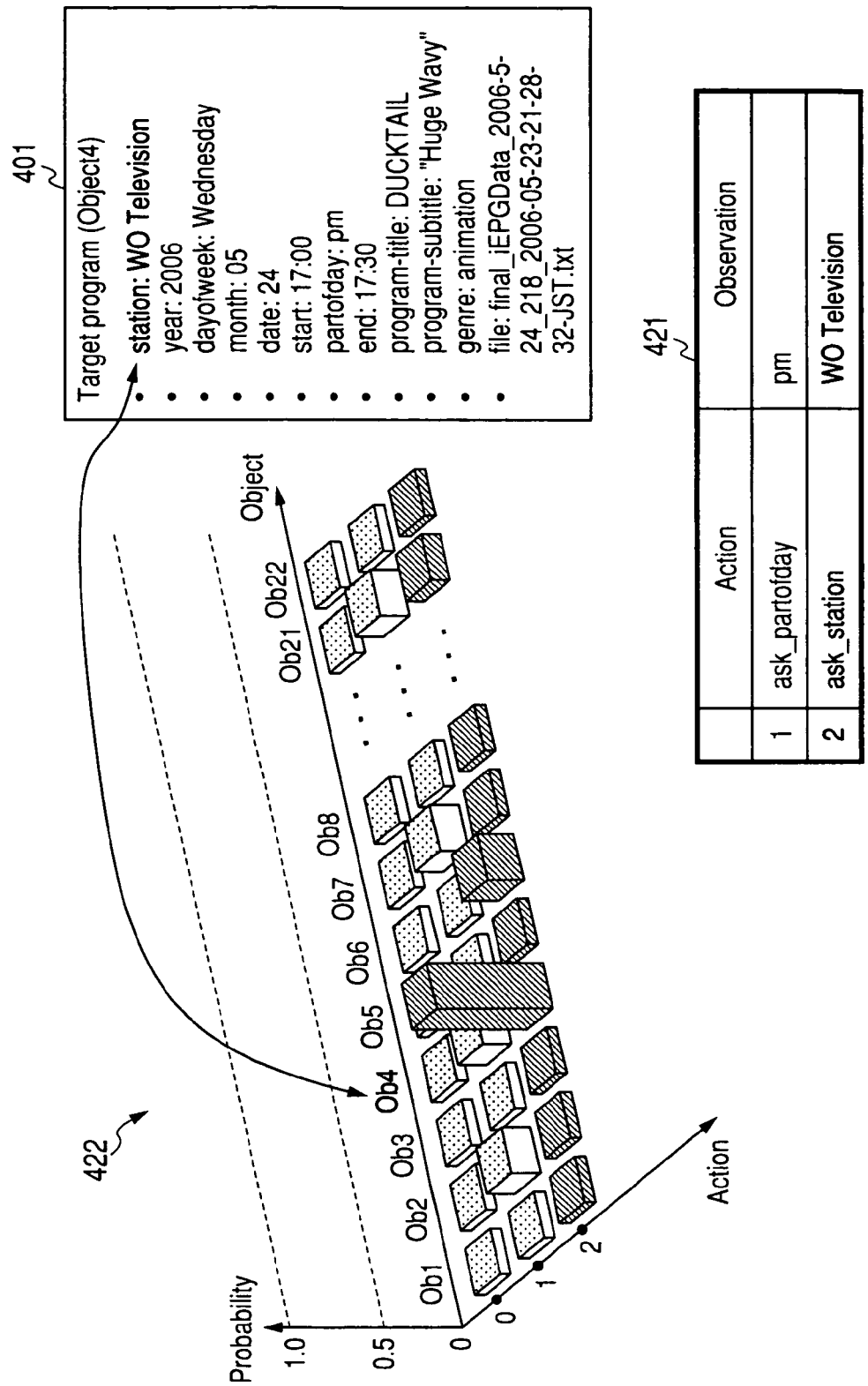
FIG. 14 is a diagram illustrating a POMDP creating processing example to be performed by an information processing apparatus according to an embodiment of the invention.

FIG. 14 shows an example of the processing of obtaining observation information and creating a probability distribution graph based on the second action. As described by action-observation information 421, the second action is:

Action=Which station? {ask_station}, and observation information=WO television is obtained as the observation information (Observation) to the action.

The POMDP creating section of the information processing apparatus defines probability values of:
 a right answer observation probability value [OFr %];
 a wrong answer observation probability value [OFw %]; and
 an irrelevant answer observation probability value [OFir %]
to objects based on the observation information and by applying the rules. The defined probability values are data indicated on the line corresponding to the number [2] on Action axis of the probability distribution graph 422 shown in FIG. 14. The probability values for the objects Ob4 and Ob6, for example, are defined higher. These objects are objects with higher probability values defined based on the rule that determines the distribution of probability values (that is, the rule corresponding to an observation function).

Figure 15:
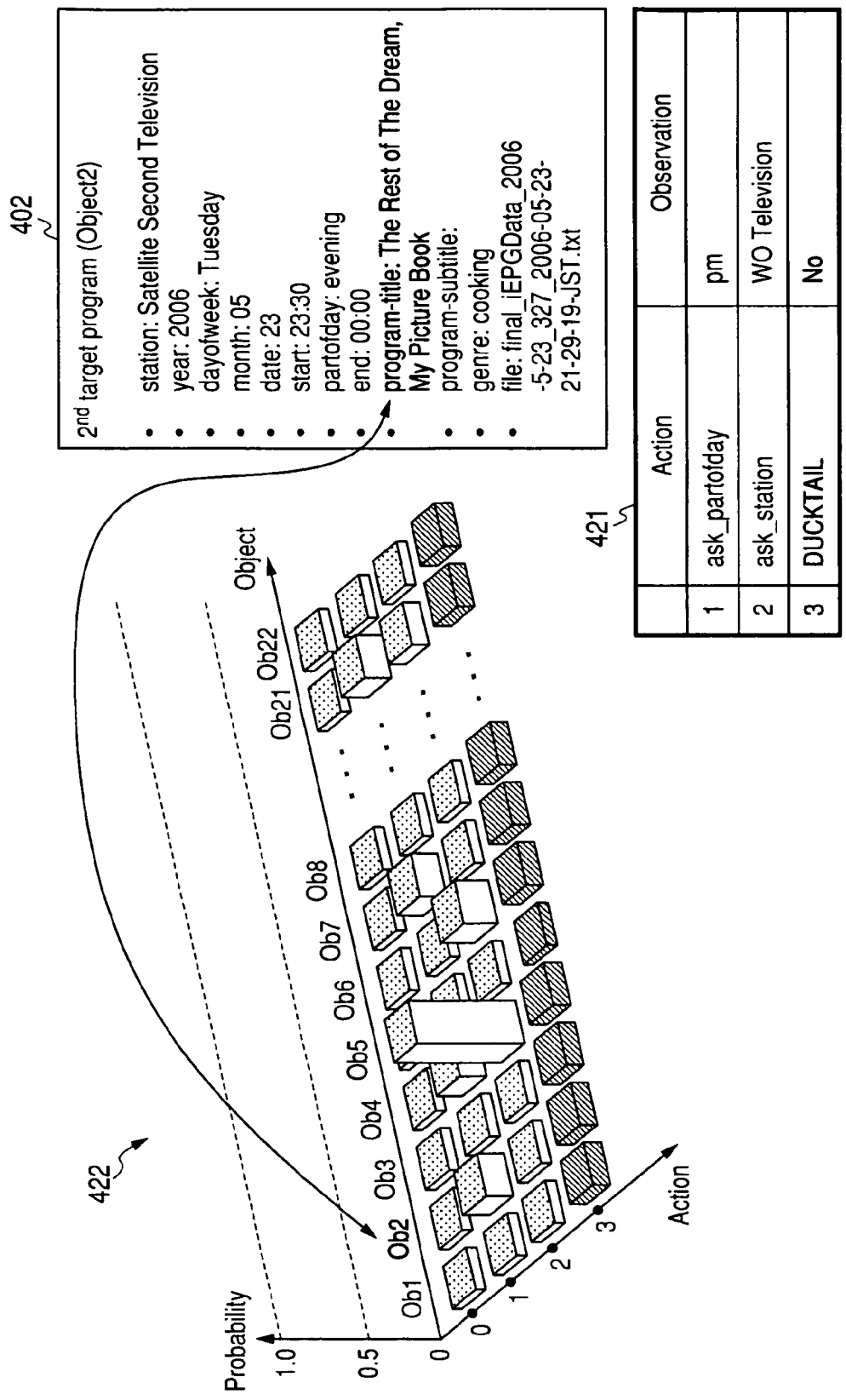
FIG. 15 is a diagram illustrating a POMDP creating processing example to be performed by an information processing apparatus according to an embodiment of the invention.

FIG. 15 shows an example of the processing of obtaining observation information and creating a probability distribution graph based on the third action. As described by action-observation information 421, the third action is:
 Action=Is the program "DUCKTAIL"?, and
 observation information=No
is obtained as the observation information (Observation) to the action.

The POMDP creating section of the information processing apparatus defines probability values of:
 a right answer observation probability value [OFr %];
 a wrong answer observation probability value [OFw %]; and
 an irrelevant answer observation probability value [OFir %]
to objects based on the observation information and by applying the rules. The defined probability values are data indicated on the line corresponding to the number [3] on Action axis of the probability distribution graph 422 shown in FIG. 15. The probability values for many objects are defined higher. These objects are objects (EPG programs), which are not the program "DUCKTAIL" and are objects with higher probability values defined based on the rule that determines the distribution of probability values (that is, the rule corresponding to an observation function).

Figure 16:
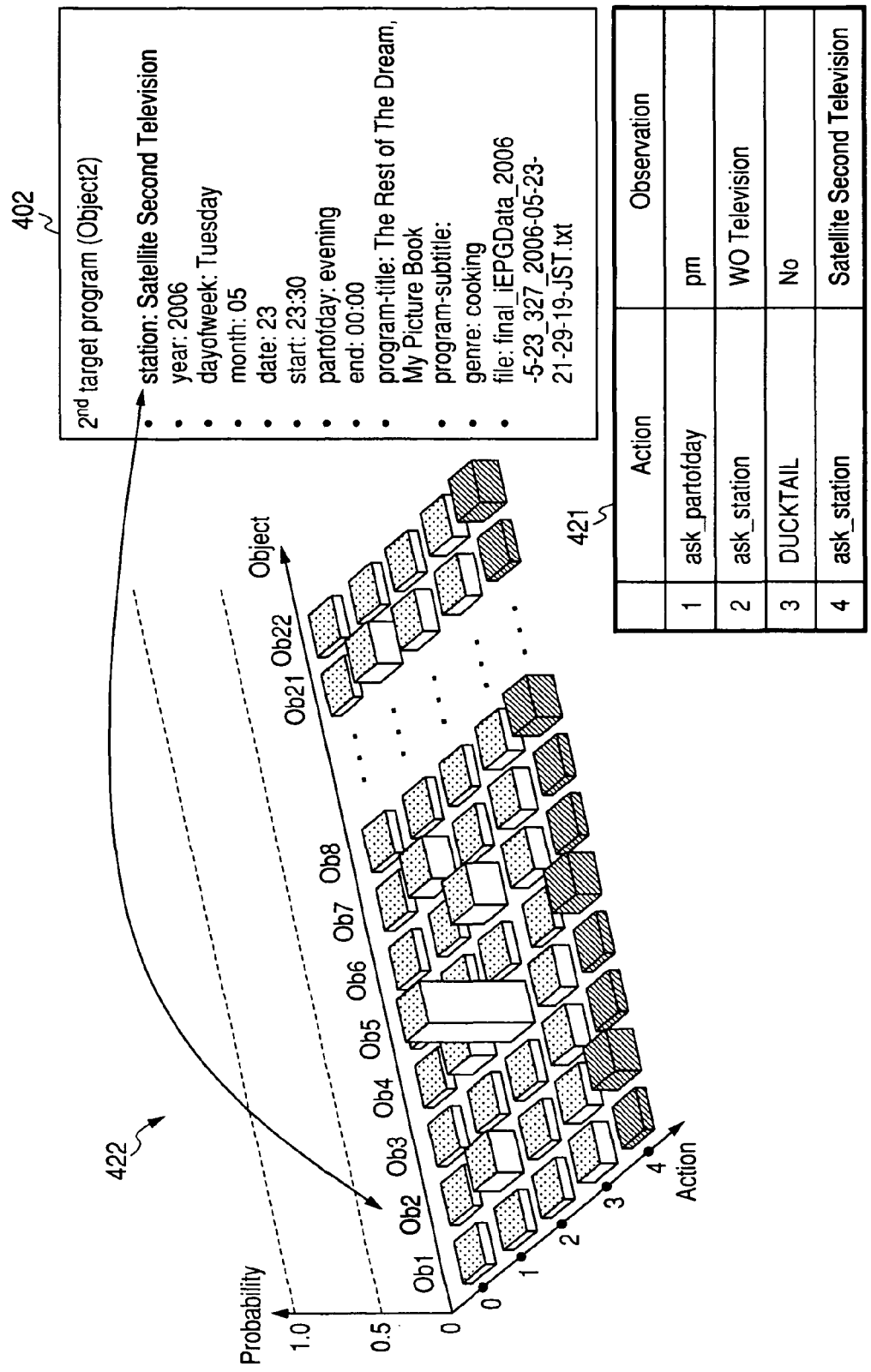
FIG. 16 is a diagram illustrating a POMDP creating processing example to be performed by an information processing apparatus according to an embodiment of the invention.

FIG. 16 shows an example of the processing of obtaining observation information and creating a probability distribution graph based on the fourth action. As described by action-observation information 421, the fourth action is:
 Action=Which station? {ask_station}, and
 observation information=Satellite Second Television is obtained as the observation information (Observation) to the action.

The POMDP creating section of the information processing apparatus defines probability values of:
 a right answer observation probability value [OFr %];
 a wrong answer observation probability value [OFw %]; and
 an irrelevant answer observation probability value [OFir %]
to objects based on the observation information and by applying the rules. The defined probability values are data indicated on the line corresponding to the number [4] on Action axis of the probability distribution graph 422 shown in FIG. 16. The probability values for the objects Ob2, Ob5 and Ob8, for example, are defined higher. These objects are objects with higher probability values defined based on the rule that determines the distribution of probability values (that is, the rule corresponding to an observation function).

Figure 17:
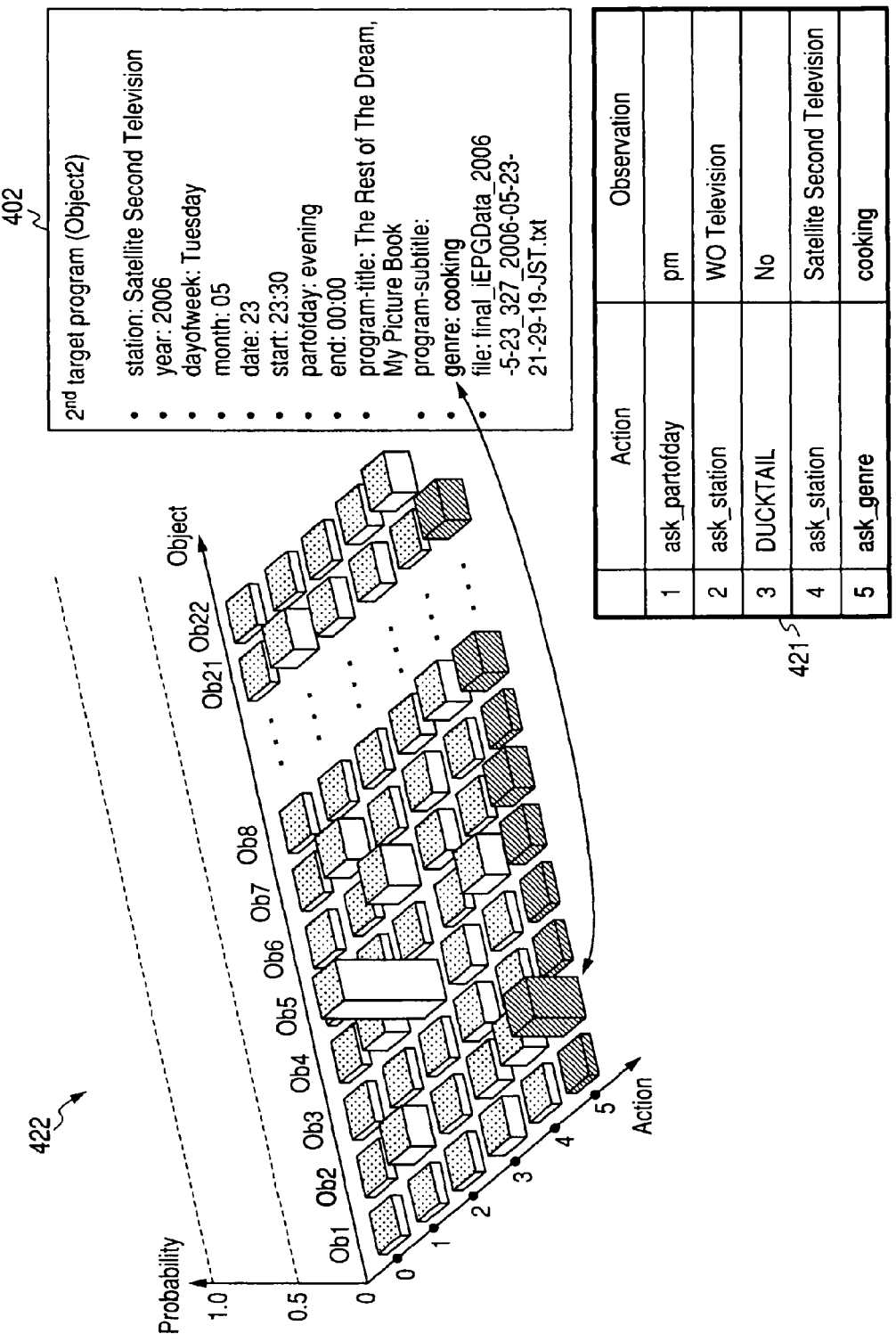
FIG. 17 is a diagram illustrating a POMDP creating processing example to be performed by an information processing apparatus according to an embodiment of the invention.

FIG. 17 shows an example of the processing of obtaining observation information and creating a probability distribution graph based on the fifth action. As described by action-observation information 421, the fifth action is:
 Action=Which genre? {ask_genre}, and
 observation information=cooking
is obtained as the observation information (Observation) to the action.

The POMDP creating section of the information processing apparatus defines probability values of:
 a right answer observation probability value [OFr %];
 a wrong answer observation probability value [OFw %]; and
 an irrelevant answer observation probability value [OFir %]
to objects based on the observation information and by applying the rules. The defined probability values are data indicated on the line corresponding to the number [5] on Action axis of the probability distribution graph 422 shown in FIG. 17. The probability values for the objects Ob2 and Ob8, for example, are defined higher. These objects are objects with higher probability values defined based on the rule that determines the distribution of probability values (that is, the rule corresponding to an observation function).

Figure 18:
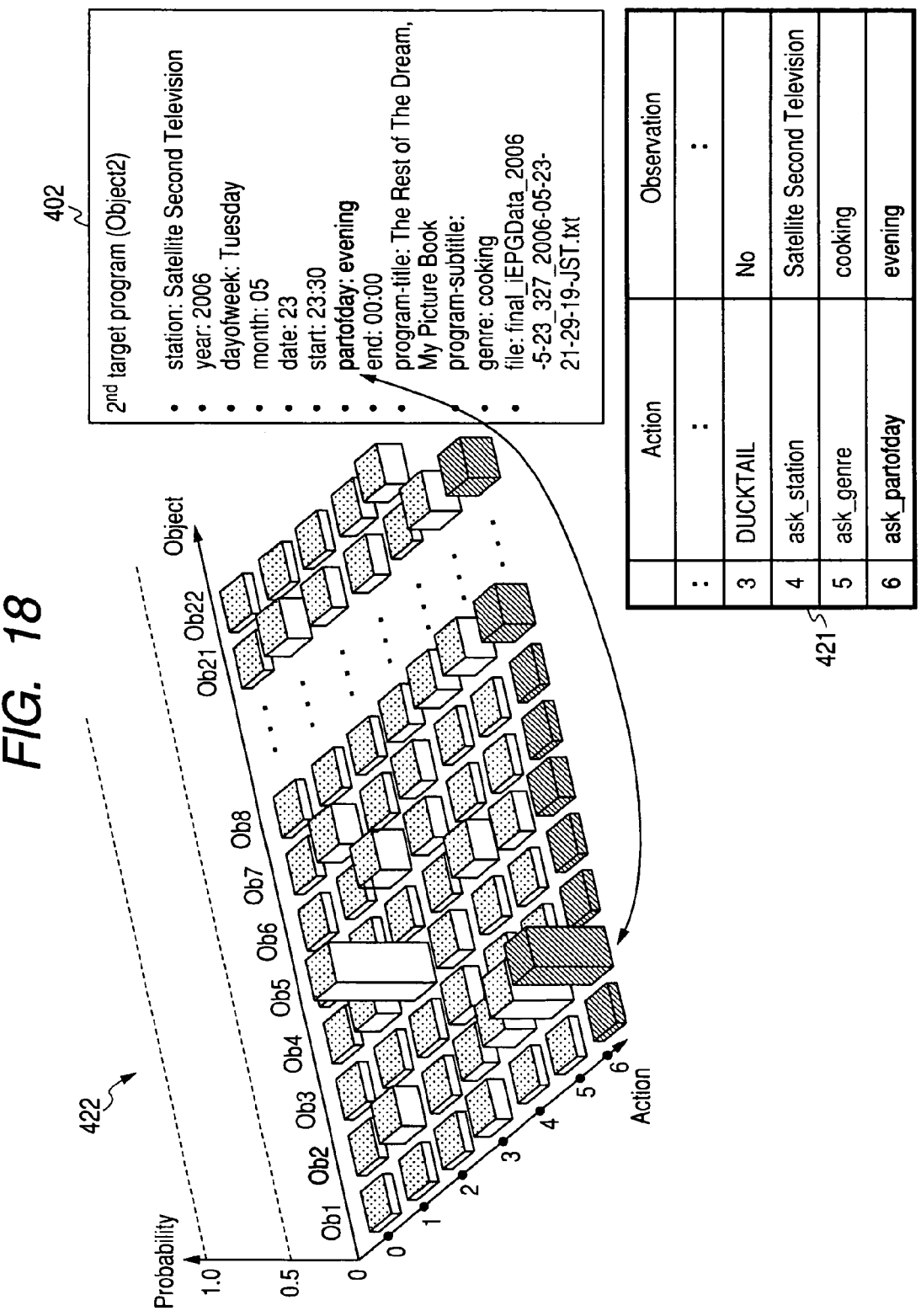
FIG. 18 is a diagram illustrating a POMDP creating processing example to be performed by an information processing apparatus according to an embodiment of the invention.

FIG. 18 shows an example of the processing of obtaining observation information and creating a probability distribution graph based on the sixth action. As described by action-observation information 421, the sixth action is:
 Action=Which part of a day? {ask_partofday}, and
 observation information=evening
is obtained as the observation information (Observation) to the action.

The POMDP creating section of the information processing apparatus defines probability values of:
 a right answer observation probability value [OFr %];
 a wrong answer observation probability value [OFw %]; and
 an irrelevant answer observation probability value [OFir %]
to objects based on the observation information and by applying the rules. The defined probability values are data indicated on the line corresponding to the number [6] on Action axis of the probability distribution graph 422 shown in FIG. 18. The probability values for the objects Ob2 and Ob8, for example, are defined higher. These objects are objects with higher probability values defined based on the rule that determines the distribution of probability values (that is, the rule corresponding to an observation function).

The object correspondence probability distribution graph 422 shown in FIG. 18 is a probability distribution graph corresponding to objects, which is created based on the six observation information pieces obtained based on the six actions (questions). In a case where, based on the probability distribution data, the total value of the probability values for each object is calculated and a list of objects is created in a decreasing order of the probabilities, the objects 401 and 402 shown in FIG. 12 may have the highest No. 1 and No. 2 probabilities. In this way, even in a case where multiple targets are to be searched, the targets can be guessed from the probability distribution information obtained by a POMDP.

Figure 19:
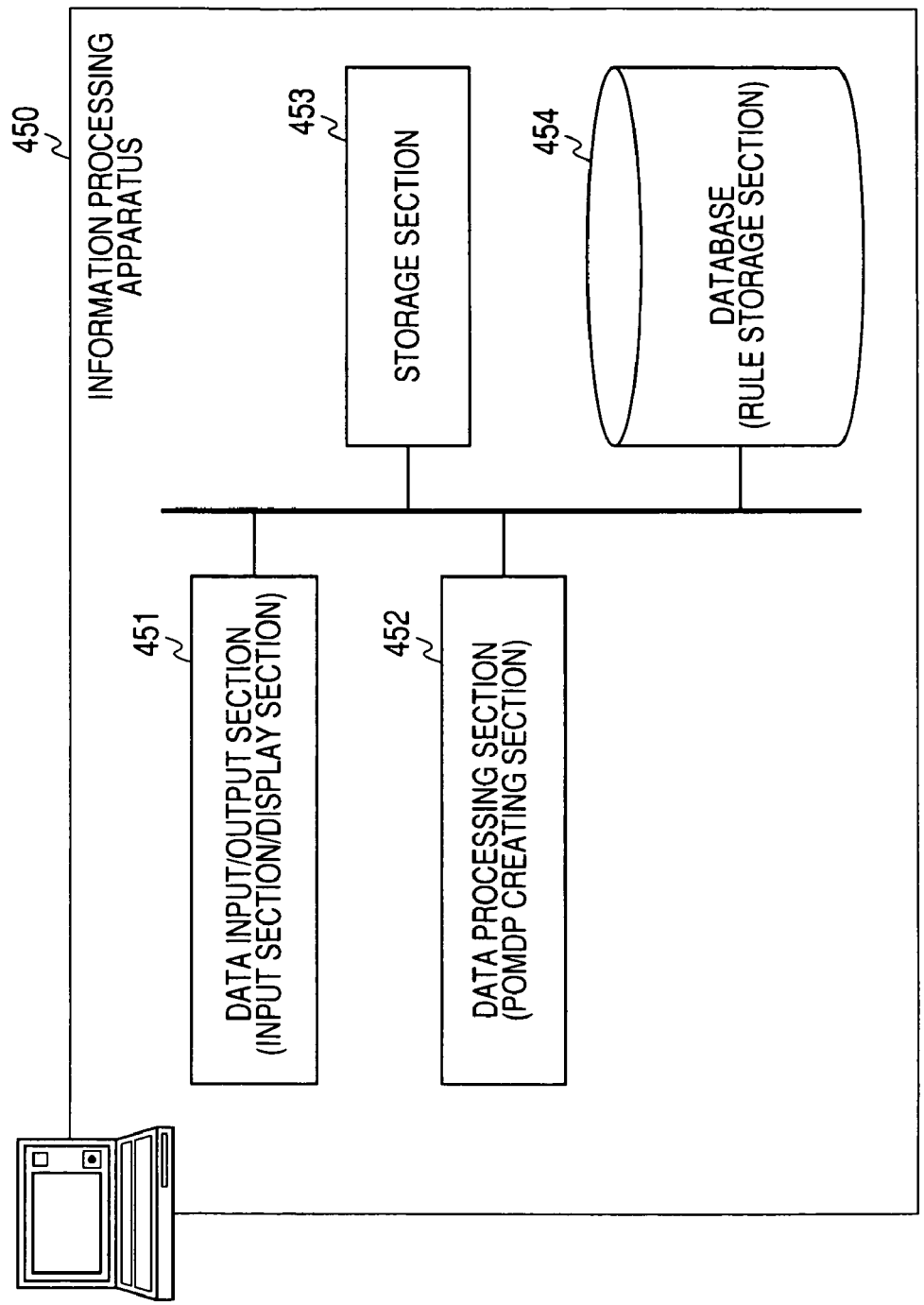
FIG. 19 is a diagram illustrating a configuration example of an information processing apparatus according to an embodiment of the invention.

With reference to FIG. 19, a functional configuration of an information processing apparatus that implements the processing of creating a POMDP will be described. FIG. 19 is a block diagram showing a functional configuration of an information processing apparatus that implements the processing of creating a POMDP. An information processing apparatus 450 is implemented by the same configuration as the general PC configuration. Notably, specific examples of the hardware configuration will be described later. The information processing apparatus 450 includes a data input/output section 451, a data processing section 452, which functions as the POMDP creating section, a storage section 453, and a database 454, which functions as the rule storage section that stores rules applicable to the POMDP creation.

Through the data input/output section 451, attribute data, that is, attribute data including attribute information (Attribute) and an attribute value (Value), which has been described above with reference to FIG. 2, is input, and a starting command is input for the processing of creating a POMDP (Factored POMDP).

The data processing section 452 functioning as the POMDP creating section performs the processing of creating a POMDP, that is, the processing of automatically creating a Partially Observable Markov Decision Process (POMDP) model to be applied to information analysis processing in a target area including uncertainty.

The database 454 functioning as the rule storage section stores a rule applicable to the processing of creating a Partially Observable Markov Decision Process (POMDP) model in the data processing section 452. The storage section 453 is a memory to be used as a storage area for a parameter and/or a program to be applied in the data processing section 452 and/or as a work area, for example.

The data processing section 452 creates a Partially Observable Markov Decision Process (POMDP) model by receiving the input of attribute data including attribute information and an attribute value, performing, as an action, processing of creating and outputting a question based on the attribute data, obtaining an answer to the question as observation information, and performing processing of creating probability distribution information corresponding to an object based on the obtained observation information.

The data processing section 452, in the processing of creating and outputting a question based on the attribute information, performs either guess action from which a specific object can be guessed based on the answer or other action excluding the guess action and performs processing of creating probability distribution information corresponding to an object based on the rule according to the action.

The data processing section 452, in the processing of creating and outputting a question based on the attribute information, performs either generic action applying the question created based on attribute information included in the attribute data or specific action applying the question created based on an attribute value included in the attribute data, and perform processing of creating probability distribution information corresponding to an object based on the rule according to the action.

The database 454 functioning as the rule storage section stores at least one rule of rules defined in a Partially Observable Markov Decision Process (POMDP) including:

(1) a rule relating to a state transition function;
(2) a rule relating to an observation function; and
(3) a rule relating to a reward function.

The data processing section 452 creates a partially observable Markov Decision Process (POMDP) by applying at least one rule of the rules relating to a state transition function, an observation function and a reward function.

The rule relating to an observation function is a rule defining a probability value to be given to each object based on observation information obtained as an answer corresponding to the question, that is, a rule defining each of:
  a right answer observation probability value [OFr %];
  a wrong answer observation probability value [OFw %]; and
  an irrelevant answer observation probability value [OFir %].

The rule relating to an observation function is a rule defining the probability based on a result of an identity determination on a meaning that the question or answer has, as described above with reference to FIGS. 7A to 8B.

The rule relating to a state transition function is a rule defining a probability [STdig %] that a change in state will not be caused by the implementation of an action excluding a guess action and a probability [STdigx %] that a change in state will not be caused by a guess action. The rule relating to a reward function is a rule defining a reward value defined correspondingly to each of:
  in (A) a guess action,
    (A1) a generic action, and
    (A2) a specific action, and
  in (B) other action,
    (B1) a generic action, and
    (B2) a specific action.

Finally, with reference to FIG. 20, a hardware configuration example of the information processing apparatus that implements the processing will be described. A central processing unit (CPU) 501 functions as the implementing subject of the processing corresponding to an operating system (OS), that is, the data processing section described in the embodiments above. More specifically, the CPU 501 implements the processing of constructing a POMDP. The processing is implemented according to a computer program stored in a data storage section such as a ROM and a hard disk in an information processing apparatus.

A ROM (read only memory) 502 stores a program to be used by the CPU 501, a POMDP creating processing program, an operation parameter and so on. A RAM (random access memory) 503 stores a program to be used for the implementation by the CPU 501 and a parameter that varies in the implementation as necessary, for example. The ROM 502 and RAM 503 are mutually connected via a host bus 504 including a CPU bus.

The host bus 504 is connected to an external bus 506 such as a PCI (Peripheral Component Interconnect/Interface) bus through a bridge 505.

A keyboard 508 and a pointing device 509 are input devices to be operated by a user. A display 510 includes a liquid crystal display device or a cathode ray tube (CRT).

A HDD (hard disk drive) 511 internally contains a hard disk and drives the hard disk and causes to record or play a program or information to be implemented by the CPU 501. The hard disk may be used as storage means for a rule to be applied to the POMDP creation, for example, and stores a computer program such as a data processing program.

A drive 512 loads data or a program recorded in a removable recording medium 512 such as a magnetic disc, an optical disc, a magnetooptical disc and a semiconductor memory, which is installed thereto, and supplies the data or program to the RAM 503 through an interface 507, the external bus 506, the bridge 505 and the host bus 504.

A connect port 514 is a port for connecting an external connecting device 522 and has connecting sections for USB and/or IEEE 1394. The connect port 514 is connected to the CPU 501 through the interface 507, external bus 506, bridge 505 and host bus 504, for example. A communication section 515 is connected to a network. For example, attribute data and/or a rule may be input through the communication section 515.

Figure 20:
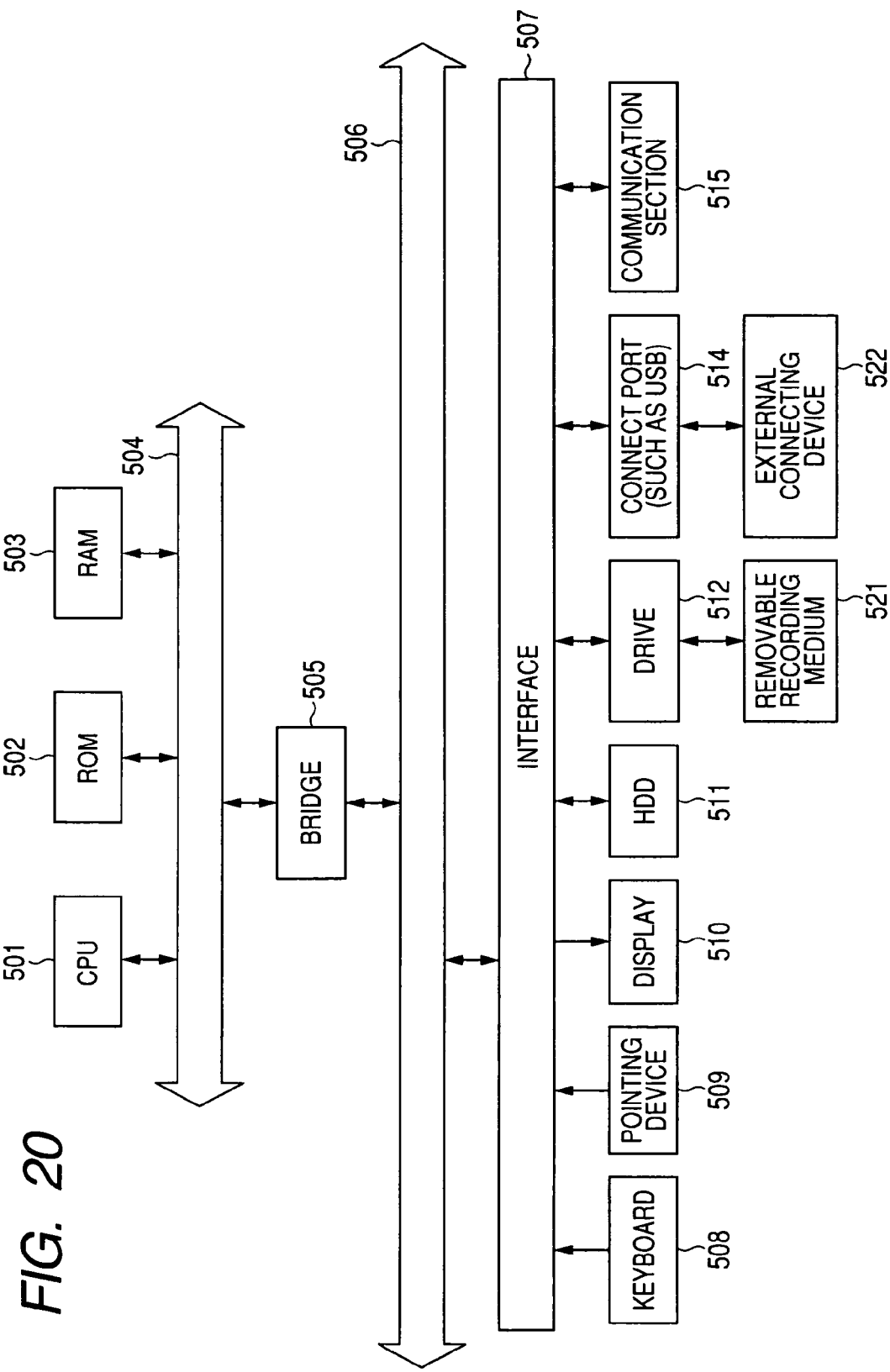
FIG. 20 is a diagram illustrating a hardware configuration example of an information processing apparatus according to an embodiment of the invention.

The hardware configuration example of the information processing apparatus shown in FIG. 20 is an example of the apparatus configured by applying a PC. The invention is not limited to the configuration shown in FIG. 20 but is applicable to various apparatus that can implement the processing described in the embodiments above.

The invention has been described above in detail with reference to the specific embodiments. However, it is self-evident that those skilled in the art can modify and/or alter the embodiments without departing from the spirit and scope of the invention. In other words, the invention has been disclosed by illustration, which should not be interpreted limitedly. The gist of the invention should be determined in consideration of the appended claims.

The processing described in the specification can be implemented by hardware, software or a combination of both. The processing may be implemented by software by installing a program recording a processing sequence to a memory within a computer built in special hardware or installing a program to a generic computer that can perform the processing.

For example, a program can be recorded on a hard disk or a ROM (read only memory), which is a recording medium, in advance. Alternatively, a program can be stored temporarily or permanently on a removable recording medium such as a flexible disc, a CD-ROM (compact disc read only memory), an MO (magnetooptical) disc, a DVD (digital versatile disc), a magnetic disc and a semiconductor memory. Such a removable recording medium is available as so-called package software.

Notably, instead of the installation of a program from a removable recording medium as described above, a program may be transferred from a download site in a wireless manner or may be transferred to a computer over a network such as a LAN (Local Area Network) and the Internet in a wired manner. The computer may receive the thus transferred program and install the program on a recording medium such as an internal hard disk.

The processing described in the specification may be implemented not only in the described time-series manner but also in parallel or separately according to the processing ability of the apparatus that implements the processing or as necessary. The systems in the specification are logical sets of multiple apparatus, and the apparatus in each of the sets is not limitedly provided within one same cabinet.

As described above, according to the configurations of the embodiments of the invention, a Partially Observable Markov Decision Process (POMDP) can be automatically created from the input of attribute-value data having attribute information and the value, such as an Electronic Program Guide (EPG) transmitted by broadcast waves, for example. For example, a Partially Observable Markov Decision Process (POMDP) model may be automatically created by performing, as an action, processing of creating and outputting a question based on the attribute data, obtaining the answer to the question as observation information, and performing processing of creating probability distribution information corresponding to an object based on the obtained observation information.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus implemented by a central processor (CPU) that constructs an information analysis processing configuration to be applied to information analysis processing in a target area including uncertainty, the apparatus comprising:

a data processing section that performs processing of automatically creating a Partially Observable Markov Decision Process (POMDP) model from the input of attribute data including attribute information and an attribute value; and a rule storage section storing a rule to be applied to processing of creating a Partially Observable Markov Decision Process (POMDP) in the data processing section, the rule storage section storing at least one rule of rules defined in a Partially Observable Markov Decision Process (POMDP) including:

(1) a rule relating to a state transition function;
(2) a rule relating to an observation function; and
(3) a rule relating to a reward function;

and wherein the data processing section is configured to apply at least one of the rules relating to a state transition function, an observation function and a reward function;

wherein the rule relating to an observation function is a rule defining a probability value to be given to each objection based on observation information obtained as an answer corresponding to the question, that is, a rule defining each of:

a right answer observation probability value {OFr %};

a wrong answer observation probability value {OFw %}; and an irrelevant answer observation probability value {OFir %};

wherein the data processing section is configured to create a Partially Observable Markov Decision Process (POMDP) model by:

performing, as an action, processing of creating and outputting a question based on the attribute data;

obtaining the answer to the question as observation information; and performing processing of creating probability distribution information corresponding to an object based on the obtained observation information.

2. The information processing apparatus according to claim 1, wherein the data processing section is configured to:

in the processing of creating and outputting a question based on the attribute data, perform either guess action from which a specific object can be guessed based on the answer or other action excluding the guess action; and perform processing of creating probability distribution information corresponding to an object based on the rule according to the action.

3. The information processing apparatus according to claim 1, wherein the data processing section is configured to:

in the processing of creating and outputting a question based on the attribute data, perform either generic action applying the question created based on attribute information included in the attribute data or specific action applying the question created based on an attribute value included in the attribute data, and perform processing of creating probability distribution information corresponding to an object based on the rule according to the action.

4. The information processing apparatus according to claim 1, wherein the rule relating to an observation function is a rule defining the probability based on a result of an identity determination on a meaning that the quest or answer has.

5. The information processing apparatus according to claim 1, wherein the rule relating to a state transition function is a rule defining:

a probability {STdig %} that a change in state will not be caused by the implementation of an action excluding a guess action; and a probability {STdigx %} that a change in state will not be caused by a guess action.

6. The information processing apparatus according to claim 1, wherein the rule relating to a reward function is a rule defining a reward value defined correspondingly to each of:
in (A) a guess action,
(A1) a generic action; and (A2) a specific action; and
in (B) other action,
(B1) a generic action; and
(B2) a specific action.

7. An information processing method that constructs an information analysis processing configuration to be applied to information analysis processing in a target area including uncertainty, the method being performed by a central processor comprising:
 a data processing step of performing processing of automatically creating a Partially Observable Markov Decision Process (POMDP) model from the input of attribute data including attribute information and an attribute value by a data processing section,
 wherein the data processing step has:
 an action step of performing, as an action, processing of creating and outputting a question based on the attribute data;
 an observation information obtaining step of obtaining the answer to the question as observation information; and
 a step of, based on a rule recorded in a rule storage section, performing processing of creating probability distribution information corresponding to an object based on the obtained observation information and creating a Partially Observable Markov Decision Process (POMDP) model, wherein the rule upon which said step of performing processing is based is
 (1) a rule relating to a state transition function;
 (2) a rule relating to an observation function; and
 (3) a rule relating to a reward function;
 wherein the rule relating to an observation function is a rule defining a probability value to be given to each objection based on observation information obtained as an answer corresponding to the question, that is, a rule defining each of:
 a right answer observation probability value {OFr %};
 a wrong answer observation probability value {OFw %}; and
 an irrelevant answer observation probability value {OFir %}.

8. A non-transitory computer readable medium that stores a computer program that causes an information processing apparatus to construct an information analysis processing configuration to be applied to information analysis processing in a target area including uncertainty, the program comprising:
 a data processing step of inputting attribute data including attribute information and an attribute value to a data processing section and performing processing of automatically creating a Partially Observable Markov Decision Process (POMDP) model,
 wherein the data processing step has:
 an action step of causing to perform, as an action, processing of creating and outputting a question based on the attribute data;
 an observation information obtaining step of causing to obtain the answer to the question as observation information; and
 a step of, based on a rule recorded in a rule storage section, causing to perform processing of creating probability distribution information corresponding to an object based on the obtained observation information and create a Partially Observable Markov Decision Process (POMDP)
 wherein the rule upon which said step of performing processing is based is
 (1) a rule relating to a state transition function;
 (2) a rule relating to an observation function; and
 (3) a rule relating to a reward function;
 wherein the rule relating to an observation function is a rule defining a probability value to be given to each objection based on observation information obtained as an answer corresponding to the question, that is, a rule defining each of:
 a right answer observation probability value {OFr %};
 a wrong answer observation probability value {OFw %}; and
 an irrelevant answer observation probability value {OFir %}.

* * * * *